United States Patent
Wane

(10) Patent No.: US 10,206,097 B2
(45) Date of Patent: *Feb. 12, 2019

(54) APPARATUSES, METHODS AND SYSTEMS FOR CONFIGURING A TRUSTED JAVA CARD VIRTUAL MACHINE USING BIOMETRIC INFORMATION

(71) Applicant: Simless, Inc., Palo Alto, CA (US)

(72) Inventor: Ismaila Wane, Mountain View, CA (US)

(73) Assignee: Simless, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,611

(22) Filed: Dec. 12, 2017

(65) Prior Publication Data

US 2018/0227748 A1  Aug. 9, 2018
US 2018/0332464 A9  Nov. 15, 2018

Related U.S. Application Data

(63) Continuation of application No. 15/040,410, filed on Feb. 10, 2016, now Pat. No. 9,860,740.

(Continued)

(51) Int. Cl.
*G06F 21/00* (2013.01)
*H04W 8/20* (2009.01)
(Continued)

(52) U.S. Cl.
CPC ........ *H04W 8/205* (2013.01); *G06F 9/45533* (2013.01); *G06F 21/64* (2013.01);
(Continued)

(58) Field of Classification Search
None
See application file for complete search history.

(56) References Cited

U.S. PATENT DOCUMENTS 5,628,030 A  5/1997 Tuckner
7,206,338 B1  4/2007 Kubler et al.
(Continued)

FOREIGN PATENT DOCUMENTS

CN  102 065 582 A  5/2011
CN  102595404 A  7/2012
(Continued)

OTHER PUBLICATIONS

Office Action for Chinese Application No. 201680041546.9 dated Jul. 17, 2018.
(Continued)

*Primary Examiner* — Shin-Hon (Eric) Chen
(74) *Attorney, Agent, or Firm* — David S. Easwaran; David Lewis

(57) ABSTRACT

Apparatuses, methods, and systems are provided for securely configuring a Java Card virtual machine operating on a cellular device's application processor. In one embodiment, a connected device with an integrated cellular modem, a virtual universal integrated circuit chip and an integrated fingerprint scanner are used. In another embodiment, the cellular device's built-in camera is used, instead of an integrated fingerprint scanner, to capture the user's facial image.

18 Claims, 15 Drawing Sheets

Related U.S. Application Data

(60) Provisional application No. 62/171,246, filed on Jun. 5, 2015, provisional application No. 62/162,740, filed on May 16, 2015.

(51) Int. Cl.

| | | |
|---|---|---|
| *H04W 4/24* | (2018.01) | |
| *H04L 29/08* | (2006.01) | |
| *H04W 8/18* | (2009.01) | |
| *H04B 1/3816* | (2015.01) | |
| *H04W 84/04* | (2009.01) | |
| *H04W 88/06* | (2009.01) | |
| *G06F 9/455* | (2018.01) | |
| *G06F 21/64* | (2013.01) | |
| *H04L 29/06* | (2006.01) | |
| *H04W 12/04* | (2009.01) | |
| *H04W 12/06* | (2009.01) | |
| *H04M 15/00* | (2006.01) | |
| *H04W 4/50* | (2018.01) | |
| *H04W 4/60* | (2018.01) | |
| *H04W 88/02* | (2009.01) | |

(52) U.S. Cl.
CPC ....... *H04B 1/3816* (2013.01); *H04L 63/0861* (2013.01); *H04L 67/30* (2013.01); *H04L 67/306* (2013.01); *H04M 15/56* (2013.01); *H04M 15/63* (2013.01); *H04M 15/7556* (2013.01); *H04M 15/8038* (2013.01); *H04W 4/24* (2013.01); *H04W 4/50* (2018.02); *H04W 4/60* (2018.02); *H04W 8/183* (2013.01); *H04W 12/04* (2013.01); *H04W 12/06* (2013.01); *H04W 84/042* (2013.01); *H04W 88/06* (2013.01); *H04W 88/02* (2013.01)

(56) References Cited

U.S. PATENT DOCUMENTS

| | | | |
|---|---|---|---|
| 7,962,765 | B2 | 6/2011 | Malcolm |
| 7,996,888 | B2 | 8/2011 | Asunmaa et al. |
| 8,200,736 | B2 | 6/2012 | Shi et al. |
| 8,238,965 | B2 | 8/2012 | Baluja et al. |
| 8,274,938 | B2 | 9/2012 | Chang et al. |
| 8,275,415 | B2 | 9/2012 | Huslak |
| 8,331,990 | B2 | 12/2012 | Larsson |
| 8,346,214 | B2 | 1/2013 | Mohammed |
| 8,447,358 | B2 | 5/2013 | Lee |
| 8,494,576 | B1 | 7/2013 | Bye et al. |
| 8,498,615 | B2 | 7/2013 | Mohammed et al. |
| 8,634,407 | B2 | 1/2014 | Mohammed et al. |
| 8,649,765 | B1* | 2/2014 | Hjelm .............. H04L 63/0861 455/410 |
| 8,649,770 | B1 | 2/2014 | Cope |
| 8,666,368 | B2 | 3/2014 | Schell et al. |
| 8,707,022 | B2 | 4/2014 | Haggerty et al. |
| 8,725,212 | B2 | 5/2014 | Pattaswamy et al. |
| 9,204,300 | B2 | 12/2015 | Park et al. |
| 9,716,788 | B2* | 7/2017 | Bendi .............. H04M 3/4288 |
| 2003/0190908 | A1* | 10/2003 | Craven .............. H04M 3/387 455/411 |
| 2004/0101114 | A1 | 5/2004 | Maytal et al. |
| 2006/0075216 | A1 | 4/2006 | Vaha-Sipila et al. |
| 2006/0078109 | A1 | 4/2006 | Akashika et al. |
| 2006/0193295 | A1 | 8/2006 | White et al. |
| 2007/0273518 | A1 | 11/2007 | Lupoli et al. |
| 2008/0064443 | A1 | 3/2008 | Shin et al. |
| 2010/0063906 | A1 | 3/2010 | Nelsen et al. |
| 2010/0223368 | A1 | 9/2010 | Runcie et al. |
| 2010/0311468 | A1* | 12/2010 | Shi .................. H04M 15/8038 455/558 |
| 2011/0028135 | A1 | 2/2011 | Srinivasan |
| 2011/0074005 | A1 | 3/2011 | Jaeger |
| 2011/0153437 | A1 | 6/2011 | Archer et al. |
| 2011/0239307 | A1 | 9/2011 | Joffray et al. |
| 2011/0269423 | A1 | 11/2011 | Schell et al. |
| 2012/0108205 | A1 | 5/2012 | Schell et al. |
| 2012/0108206 | A1 | 5/2012 | Haggerty |
| 2013/0023235 | A1* | 1/2013 | Fan .............. H04W 48/18 455/411 |
| 2013/0036231 | A1 | 2/2013 | Shuumaki |
| 2013/0046972 | A1 | 2/2013 | Campagna et al. |
| 2013/0165073 | A1 | 6/2013 | Madsen |
| 2013/0166915 | A1 | 6/2013 | Desai et al. |
| 2013/0208671 | A1 | 8/2013 | Royz et al. |
| 2013/0276124 | A1 | 10/2013 | Tahir et al. |
| 2013/0294041 | A1 | 11/2013 | Syal |
| 2013/0329639 | A1 | 12/2013 | Wietfeldt et al. |
| 2014/0004827 | A1 | 1/2014 | O'Leary |
| 2014/0031035 | A1 | 1/2014 | Tagg et al. |
| 2014/0038563 | A1 | 2/2014 | O'Leary |
| 2014/0072681 | A1 | 3/2014 | Dent |
| 2014/0073375 | A1* | 3/2014 | Li et al. .............. H04W 8/183 455/558 |
| 2014/0075506 | A1 | 3/2014 | Davis et al. |
| 2014/0082358 | A1 | 3/2014 | Nakhjiri et al. |
| 2014/0098957 | A1 | 4/2014 | Larsson |
| 2014/0105259 | A1 | 4/2014 | May-Weymann |
| 2014/0128060 | A1 | 5/2014 | Vashi et al. |
| 2014/0165173 | A1 | 6/2014 | Hjelm et al. |
| 2014/0194157 | A1 | 7/2014 | Ezekiel et al. |
| 2014/0219447 | A1 | 8/2014 | Park et al. |
| 2014/0310495 | A1 | 10/2014 | Michelogiannakis et al. |
| 2014/0317686 | A1 | 10/2014 | Vetillard |
| 2014/0342719 | A1 | 11/2014 | Lindholm |
| 2015/0017950 | A1 | 1/2015 | Zhao et al. |
| 2015/0081884 | A1 | 3/2015 | Maguire et al. |
| 2015/0100753 | A1 | 4/2015 | Shen et al. |
| 2015/0113617 | A1* | 4/2015 | Chastain .............. G06F 21/31 726/6 |
| 2015/0163840 | A1 | 6/2015 | Ji et al. |
| 2015/0200934 | A1 | 7/2015 | Naguib |
| 2015/0271662 | A1 | 9/2015 | Lhamon et al. |
| 2015/0289129 | A1 | 10/2015 | Li et al. |
| 2015/0301975 | A1 | 10/2015 | Garg et al. |
| 2015/0304506 | A1 | 10/2015 | Zhu et al. |
| 2015/0334111 | A1 | 11/2015 | Ziat |
| 2015/0341791 | A1 | 11/2015 | Yang et al. |
| 2015/0347786 | A1 | 12/2015 | Yang et al. |
| 2015/0350877 | A1 | 12/2015 | Li et al. |
| 2015/0350879 | A1 | 12/2015 | Li et al. |
| 2015/0350880 | A1 | 12/2015 | Li et al. |
| 2015/0373530 | A1 | 12/2015 | Stein |
| 2016/0007190 | A1 | 1/2016 | Wane |
| 2016/0057624 | A1 | 2/2016 | Yang et al. |
| 2016/0088464 | A1* | 3/2016 | Hans .............. H04W 8/183 455/558 |
| 2016/0149877 | A1 | 5/2016 | Kancharla et al. |
| 2016/0277394 | A1* | 9/2016 | Berthet .............. H04W 12/06 |
| 2016/0330608 | A1* | 11/2016 | Benn .............. H04W 8/183 |
| 2017/0094628 | A1 | 3/2017 | Miao et al. |
| 2017/0150355 | A1* | 5/2017 | Bergius .............. H04L 9/3271 |
| 2017/0344939 | A1 | 11/2017 | Linton et al. |
| 2018/0032771 | A1 | 2/2018 | Lupoli et al. |

FOREIGN PATENT DOCUMENTS

| | | |
|---|---|---|
| CN | 103748906 A | 4/2014 |
| CN | 103797827 A | 5/2014 |
| CN | 103853590 A | 6/2014 |
| EP | 0936530 A1 | 8/1999 |
| WO | WO 2011/106569 A2 | 9/2011 |
| WO | WO 2012 076437 A2 | 6/2012 |
| WO | WO 2012/154600 | 11/2012 |
| WO | WO 2012/174461 | 12/2012 |
| WO | WO 2014/018356 | 1/2014 |
| WO | WO 2014/032081 | 3/2014 |

(56) References Cited

FOREIGN PATENT DOCUMENTS

| WO | WO 2014/088874 | 6/2014 |
|---|---|---|
| WO | WO 2014/101094 A1 | 7/2014 |

OTHER PUBLICATIONS

2nd Written Opinion for International Application No. PCT/IB2015/057178 dated Sep. 29, 2016.
2nd Written Opinion for International Application No. PCT/IB2016/050708 dated Apr. 25, 2017, 13 pages.
Areno, M. et al., Security Trusted Execution Environments With PUF Generated Secret Keys, 2011 IEEE 11th International Conference on Trust, Security and Privacy in Computing and Communications (2012) pp. 1188-1193.
In Re: Ismaila Wane; U.S. Application titled Apparatus, Methods and System for a Trusted Subscription Management Platform; U.S. Appl. No. 62/051,311, filed Sep. 17, 2014, 39 pages.
In Re: Ismaila Wane; U.S. Application titled Apparatuses, Methods and Systems for Implementing a System-On-Chip with Integrated Reprogrammable Cellular Network Connectivity; U.S. Appl. No. 14/934,310, filed Nov. 6, 2015, 32 pages.
In Re: Ismaila Wane; U.S. Application titled Method for Configuring a Trusted Java Card Virtual Machine Using Biometric Information; U.S. Appl. No. 62/171,246, filed Jun. 5, 2015, 16 pages.
In Re: Ismaila Wane; U.S. Application titled Method for Virtualizing a Reprogrammable Universal Integrated Circuit Chip on an Application Processor; U.S. Appl. No. 62/162,740, filed May 16, 2015, 18 pages.
In Re: Ismaila Wane; U.S. Application titled Methods for a System-On-Chip with Integrated Reprogrammable Cellular Network Connectivity; U.S. Appl. No. 62/078,006, filed Nov. 11, 2014, 20 pages.
International Preliminary Report on Patentability (Chapter II) from International Application No. PCT/IB2016/050708, dated Aug. 18, 2017, 34 pages.
International Search Report and Written Opinion for International Application No. PCT/IB2015/057178 dated Jun. 2, 2016, 16 pages.
International Search Report and Written Opinion for International Application No. PCT/IB2015/058681 dated Feb. 19, 2016, 20 pages.
International Search Report and Written Opinion for International Application No. PCT/IB2016/050708 dated May 25, 2016, 16 pages.
Li, C. et al., A Trusted Virtual Machine in an Untrusted Management Environment, IEEE Transactions on Services Computing, vol. 5, No. 4 (Oct.-Dec. 2012) pp. 472-483.
Notice of Allowance for U.S. Appl. No. 15/040,410 dated Oct. 11, 2017, 35 pages.
Notice of Allowance for U.S. Appl. No. 15/040,425 dated Aug. 23, 2016.
Office Action for U.S. Appl. No. 14/856,974 dated Jan. 3, 2017, 18 pages.
Office Action for U.S. Appl. No. 14/856,974 dated Jun. 16, 2016.
Office Action for U.S. Appl. No. 14/856,991 dated Jan. 17, 2017, 16 pages.
Office Action for U.S. Appl. No. 14/856,991 dated Jun. 30, 2016.
Office Action for U.S. Appl. No. 14/934,310 dated Jul. 1, 2016.
Office Action for U.S. Appl. No. 14/934,310 dated Mar. 3, 2017.
Office Action for U.S. Appl. No. 14/934,310 dated Sep. 18, 2017, 12 pages.
Office Action for U.S. Appl. No. 15/040,425 dated Apr. 20, 2016, 14 pages.
Office Action for U.S. Appl. No. 15/283,491 dated Jun. 1, 2017, 15 pages.
Office Action for U.S. Appl. No. 15/283,491 dated Nov. 15, 2017, 12 pages.
Office Action from U.S. Appl. No. 14/856,991, dated Jan. 12, 2018, 18 pages.
Ravichandran et al. "Network on Chip with CDMA Technique", Journal of Scientific & Industrial Research, vol. 73, Apr. 2014, pp. 209-213.
Remote Provisioning Architecture for Embedded UICC Technical Specification Version 1.0 Dec. 17, 2013 [online] [retrieved Oct. 23, 2015]. Retrieved from the Internet: <URL: http://www.gsma.com/connectedliving/wp-content/uploads/2014/01/.2-GSMA-Remote-Provisioning-Architecture-for-Embedded-UICC-Technical-Specification-Version-1.0.pdf>. (dated Dec. 17, 2013) 294 pages.
Reprogrammable SIMS: Technology, Evolution and Implications [online] [retrieved Oct. 23, 2015]. Retrieved from the Internet: <URL: http://stakeholders.ofcom.org.uk/binaries/research/telecoms-research/reprogrammable-sims.pdf>. (dated Sep. 25, 2012) 95 pages.
Vahidian, E., *Evolution of the SIM to eSIM*, NTNU Norwegian University of Science and Technology, Jan. 21, 2013. Retrieved from the Internet: URL: http://www.diva-portal.org/smash/get/diva2:617036/fulltext01.pdf [retrieved on Jun. 9, 2016]. 110 pages.
Notice of Allowance from U.S. Appl. No. 14/856,974, dated Jan. 22, 2018, 12 pages.
Notice of Allowance for U.S. Appl. No. 14/856,991 dated May 9, 2018.
Panel Decision from Pre-Appeal Brief Review for U.S. Appl. No. 15/283,491 dated Apr. 30, 2018.
Office Action for U.S. Appl. No. 15/283,491 dated May 17, 2018, 10 pages.

* cited by examiner

APPARATUSES, METHODS AND SYSTEMS FOR CONFIGURING A TRUSTED JAVA CARD VIRTUAL MACHINE USING BIOMETRIC INFORMATION

CROSS-REFERENCE TO RELATED APPLICATIONS

This application is a continuation of U.S. patent application Ser. No. 15/040,410, filed Feb. 10, 2016, which claims the benefit of: U.S. Provisional Patent Application No. 62/162,740, filed May 16, 2015; and U.S. Provisional Patent Application No. 62/171,246, filed Jun. 5, 2015. This application is also related to U.S. Provisional Patent Application No. 62/051,311, filed Sep. 17, 2014, and U.S. Provisional Patent Application No. 62/078,006, filed Nov. 11, 2014. The entire contents of each of the above applications are incorporated herein by reference.

TECHNOLOGICAL FIELD

Example embodiments of the present invention relate generally to the fields of software security, virtualization, and telecommunications, and more particularly, to the emulation in software of a reprogrammable universal integrated circuit chip.

BACKGROUND

According to the GSM Association (GSMA), there are over 5 billion subscriber identity module (SIM) cards deployed in the world each year. In addition, there will be over 50 billion connected devices in the so-called Internet of Things (IoT) by 2020, according to various industry reports. Access to the Internet will be generally facilitated via cellular networks through physical SIM cards integrated into these IoT devices.

OEMs that want to add connectivity functionality into devices will therefore need to design applications that are aware of device capabilities to capture sensor data and communicate with a remote server for an application-specific task. Using conventional methods, this would require procuring and integrating physical SIM cards into the potential billions of devices manufactured. These physical SIM cards would generally require wireless modules that are integrated into the Printed Circuit Boards (PCBs) of these devices. A wireless module and physical SIM will increase the bill of materials (BoM) of such devices. Furthermore, an OEM manufacturer will need to find and select a mobile network operator (MNO) that will provide coverage in the geographic areas that the connected devices will be deployed. The selection process may depend on various parameters such as pricing, network quality, coverage, etc. However, as there are thousands of cellular network operators in the world with an average of 4 or more cellular network operator in many countries, the discovery and selection process becomes quickly very challenging for these OEMs and/or third party entities managing the access to connectivity for these devices. The third party entities could be either enterprises or consumers who own these connected devices may be interchangeably referred to herein as the owners of the connected (or IoT) devices.

In view of the above issues, there is a clear friction in accessing local cellular networks faced by consumers and enterprises managing connected devices in a global market where people and things are fundamentally mobile. Because access is predicated on the use of SIM cards, this friction is magnified by the current physical nature of SIM cards.

From the standard 2FF card (mini-SIM) to the 4FF card (nano-SIM), SIM cards have now evolved to the MFF2 form factor, which is mainly used in machine-to-machine (M2M) applications. Introduction of the MFF2 form factor and its subsequent smaller iterations into the Internet of Things (IoT) could radically alter the manufacturing and deployment of IoT devices.

In December of 2013, the GSMA, which is the largest association of mobile operators and related companies, essentially standardized how reprogrammable SIM cards are architected and remotely provisioned. As a result of the standardization efforts, many new use cases will be soon possible in an interoperable manner. These use cases include the ability to seamlessly select and switch cellular networks without physically changing SIM cards.

Although the GSMA's specifications were developed primarily for M2M devices, nothing prevents those skilled in the art from using them for other types of connected devices as well. Doing so would therefore remove the current friction of switching networks faced by people and things in international roaming situations or in local geographic areas with multiple cellular carriers. This provides people and devices with the ability to dynamically change cellular networks to extract the best value for mobile communication needs based on preferences for price, data speed, network quality, etc.

For local telecom regulators, virtual SIM card technology lowers the barriers to switching networks and thereby fosters a healthy and competitive telecommunications landscape in which MNOs and Mobile Virtual Network Operators (MVNOs) compete on price, service quality and innovation.

For OEMs, virtual SIM card technology provides more space in the printed circuit board assembly (PCBA) design, allowing the incorporation of additional sensors or other chip components and hence optimizes the PCB layout. It also removes the complexity of dealing with various SIM card vendors approved by MNOs in "kitting" environments.

MNOs stand to immensely benefit from virtual SIM card technology as well. The technology may facilitate enhanced distribution because M(V)NO service discovery, selection and provisioning could all take place remotely over the "cloud." Such a mobile application could then help effectively streamline the redundant Know Your Customer (KYC) procedures currently in effect in many countries. Moreover, for all M(V)NOs, regardless of market position, this technology can eliminate the costs of procuring, testing, certifying and distributing physical SIM cards by removing the inherent logistical complexities associated with managing physical SIM cards. This will enable MNOs to better focus capital spend and management attention on network capacity, coverage and other differentiated services. Ultimately, this technology may reduce the current cost of acquiring and retaining subscribers, potentially improving thus the bottom line for M(V)NOs.

Finally, virtual SIM card technology may provide important environmental benefits by lowering the overall volume of manufactured SIM cards globally. It remains unclear if most of the billions of SIM cards produced each year are still not halogen-free as halogen is toxically corrosive, which therefore has the potential to damage people's health and their environment.

BRIEF SUMMARY

Example embodiments described herein detail device configurations for fully emulating a reprogrammable embedded universal integrated circuit chip (eUICC) in a connected device's operating system that is running on the connected device's application processor. More specifically, example embodiments illustrate on-die virtual (software) eUICCs running on dedicated application processors of a system-on-chip. In this regard, example embodiments may incorporate elements described previously in U.S. Non-Provisional patent application Ser. No. 14/856,974, filed Sep. 17, 2015, and U.S. patent application Ser. No. 14/934,310, filed Nov. 6, 2015. The entire contents of both of these applications are incorporated herein.

In example embodiments that are implemented by a connected device (e.g., a user device or an IoT device), an integrated cellular modem in the connected device is configured to use a simple protocol to communicate with a virtual eUICC. This protocol may be implemented in a way that allows cellular modem vendors to rapidly and cost-effectively support its functionality and which further may allow original equipment manufacturers to provide the functionality in connected devices already deployed in the field via a simple over-the-air firmware upgrade.

In a first example embodiment, a mobile station is provided. The mobile station includes a modem and at least one antenna configured to communicate in multi-active mode with a plurality of cellular networks. The mobile station further includes an application processor physically connected to a baseband processor, wherein the physical connection facilitates secure transmission of commands to the application processor from a cellular modem application hosted by the baseband processor. In addition, the mobile station includes one or more memories storing computer-executable instructions that, when executed, configure a mobile application running on the application processor to, in response to receipt of commands from the baseband processor, communicate with a virtual reprogrammable universal integrated circuit chip (eUICC) that is not physically or electrically connected to the baseband processor.

In some embodiments, the virtual eUICC is stored within a trusted execution environment (TEE) of the application processor. In some such embodiments, the TEE provides access to the virtual eUICC using one or more physically unclonable functions (PUFs). In this regard, at least one of the PUFs may comprise a biometric signal source.

In some embodiments, the biometric signal source comprises a biometric information capturing element, wherein the user-provided biometric information is captured by the biometric information capturing element. In some such embodiments, the biometric information capturing element comprises a built-in fingerprint scanner or camera device.

In some embodiments, the computer-executable instructions, when executed, further cause configuration of a virtual machine to host the virtual eUICC. In some such embodiments, the computer-executable instructions, when executed, cause configuration of the virtual machine by causing: initialization of a data storage module of the virtual machine with the user-provided biometric information as a parameter to create encryption, decryption, and signature keys; loading of the data storage module upon each device boot-up; encryption and decryption of data associated with the virtual machine using the encryption and decryption keys; digital signing of data associated with the virtual machine using the signature key; and storage of the digitally signed data in a storage memory. In this regard, the digitally signed data may comprise at least one of a GSM file system, one or more Java Card applications, or one or more network authentication keys, wherein the digitally signed data is formatted into data blocks. In one embodiment, the storage memory maintains the data blocks in a journaling file system. Additionally or alternatively, digitally signing the data comprises signing checksums or hashes of the data with the signature key. Moreover, digitally signing the data may include calculating redundancy check values for the data, and signing the redundancy check values with random keys.

In some embodiments, the virtual eUICC is hosted by a device that is remote from the mobile station.

In some embodiments, the baseband processor is programmed to non-electrically attach to the virtual eUICC. In some such embodiments, non-electrical attachment may comprise a transmission to the application processor of a command initiated by the baseband processor. In this regard, a radio interface layer of the application processor may be configured to interpret and forward the command to the virtual eUICC.

In some embodiments, the virtual eUICC is configured to receive indirect requests from the baseband processor and generate responses to the indirect requests. In some such embodiments, the computer-executable instructions configure the application processor to communicate with the virtual eUICC via a radio interface layer of the application processor that is configured to receive the generated responses to the indirect requests and forward the generated responses to the baseband processor.

In another example embodiment, a method is provided for communicating in multi-active mode with a plurality of cellular networks by a mobile station comprising a modem and at least one antenna. The method includes providing, in the mobile station, an application processor physically connected to a baseband processor, wherein the physical connection facilitates secure transmission of commands to the application processor from a cellular modem application hosted by the baseband processor. The method further includes, in response to receipt of commands from the baseband processor, communicating, by a mobile application running on the application processor, with a virtual reprogrammable universal integrated circuit chip (eUICC) that is not physically or electrically connected to the baseband processor.

In some embodiments, the virtual eUICC is stored within a trusted execution environment (TEE) of the application processor. In some such embodiments, the TEE provides access to the virtual eUICC using one or more physically unclonable functions (PUFs). In this regard, at least one of the PUFs may comprise a biometric signal source.

In some embodiments, the mobile device further includes a biometric information capturing element, and wherein the method includes capturing the user-provided biometric information using the biometric information capturing element. In some such embodiments, the biometric information capturing element comprises a built-in fingerprint scanner or camera device.

In some embodiments, the method includes causing configuration of a virtual machine to host the virtual eUICC. In this regard, causing configuration of the virtual machine includes causing: initialization of a data storage module of the virtual machine with the user-provided biometric information as a parameter to create encryption, decryption, and signature keys; loading of the data storage module upon each device boot-up; encryption and decryption of data associated with the virtual machine using the encryption and decryption keys; digital signing of data associated with the virtual machine using the signature key; and storage of the digitally signed data in a storage memory. For instance, the digitally signed data may comprise at least one of a GSM file system, one or more Java Card applications, or one or more network authentication keys, and the digitally signed data may be formatted into data blocks. Additionally or alternatively, the method may include maintaining the data blocks in a journaling file system in the storage memory.

In some embodiments, digitally signing the data comprises signing checksums or hashes of the data with the signature key. In some embodiments, wherein digitally signing the data comprises calculating redundancy check values for the data, and signing the redundancy check values with random keys.

In some embodiments, the virtual eUICC is hosted by a device that is remote from the mobile station.

In some embodiments, the method further includes non-electrically attaching, by the baseband processor of the mobile station, to the virtual eUICC. In some such embodiments, non-electrical attachment may comprise a transmission to the application processor of a command initiated by the baseband processor. In this regard, the method may further include interpreting, by a radio interface layer of the application processor, the command, and forwarding, by the radio interface layer of the application processor, the command to the virtual eUICC.

In some embodiments, the virtual eUICC is configured to receive indirect requests from the baseband processor and generate responses to the indirect requests. In some such embodiments, communicating, by the application processor, with the virtual eUICC includes receiving, by a radio interface layer of the application processor, the generated responses to the indirect requests, and forwarding, by the radio interface layer of the application processor, the generated responses to the baseband processor.

In yet another example embodiment, a mobile station is provided. The mobile station includes means for communicating in multi-active mode with a plurality of cellular networks, and an application processor physically connected to a baseband processor, wherein the physical connection facilitates secure transmission of commands to the application processor from a cellular modem application hosted by the baseband processor. The mobile station further includes means for communicating, by the application processor and in response to receipt of commands from the baseband processor, with a virtual reprogrammable universal integrated circuit chip (eUICC) that is not physically or electrically connected to the baseband processor.

In some embodiments, the virtual eUICC is stored within a trusted execution environment (TEE) of the application processor. In some such embodiments, the TEE provides access to the virtual eUICC using one or more physically unclonable functions (PUFs). In this regard, at least one of the PUFs may comprise a biometric signal source.

In some embodiments, the biometric signal source comprises a biometric information capturing element, wherein the user-provided biometric information is captured by the biometric information capturing element. For instance, the biometric information capturing element may comprise a built-in fingerprint scanner or camera device.

In some embodiments, the mobile station includes means for causing configuration of a virtual machine to host the virtual eUICC. In this regard, the means for causing configuration of the virtual machine includes: means for causing initialization of a data storage module of the virtual machine with the user-provided biometric information as a parameter to create encryption, decryption, and signature keys; means for causing loading of the data storage module upon each device boot-up; means for causing encryption and decryption of data associated with the virtual machine using the encryption and decryption keys; means for causing digitally signing of data associated with the virtual machine using the signature key; and means for causing storage of the digitally signed data in a storage memory.

In some such embodiments, the digitally signed data comprises at least one of a GSM file system, one or more Java Card applications, or one or more network authentication keys, and the digitally signed data is formatted into data blocks. Additionally or alternatively, the storage memory maintains the data blocks in a journaling file system. Moreover, in some embodiments, digitally signing the data associated with the virtual machine comprises signing checksums or hashes of the data with the signature key. Additionally or alternatively, the means for digitally signing the data associated with the virtual machine includes means for calculating redundancy check values for the data, and means for signing the redundancy check values with random keys.

In some embodiments, the virtual eUICC is hosted by a device that is remote from the mobile station.

In some embodiments, the mobile station further includes means for non-electrically attaching the baseband processor to the virtual eUICC. In some such embodiments, non-electrical attachment may comprise a transmission to the application processor of a command initiated by the baseband processor. In this regard, the application processor may further include means for interpreting the command and means for forwarding the command to the virtual eUICC.

In some embodiments, the virtual eUICC is configured to receive indirect requests from the baseband processor and generate responses to the indirect requests. In some such embodiments, the means for communicating, by the application processor, with the virtual eUICC includes means for receiving the generated responses to the indirect requests, and means for forwarding the generated responses to the baseband processor.

In addition, it should be understood that embodiments described herein may utilize biometric information to securely configure a Java Card virtual machine operating in a mobile device's application.

While a Trusted Execution Environment (TEE) may in some situations be used to provide a secure container for a virtual eUICC, and while TEE-enabled devices have been massively deployed in recent years, they are still underused and fragmented from a developer's perspective. Furthermore, there are many instances where a TEE is not available for use.

Example embodiments described herein provide configurations for securing a virtual eUICC running on an application processor in situations where a trusted execution environment is not available. As disclosed in greater detail below, example embodiments utilize biometric information in conjunction with an encrypted file system to secure a virtual eUICC running on an application processor. Such embodiments employ the unclonable characteristics of biometric data (e.g., a fingerprint, a facial image, or the like). In some embodiments, such unclonable characteristics also utilize other sensor information, such as accelerometer and/or gyroscope data while requiring the end-user to perform a set of movements known only to the end-user (e.g., shaking the mobile device in a certain pattern).

In another example embodiment, a mobile station is provided. The mobile station includes a modem and at least one antenna configured to communicate with a plurality of cellular networks. The mobile station further includes one or more memories storing computer-executable instructions that, when executed, configure a mobile application running on a processor that facilitates communication between the modem and a virtual reprogrammable universal integrated circuit chip (eUICC) that is not physically or electrically connected to the modem, wherein security of the virtual eUICC is maintained using user-provided biometric information.

In some embodiments, the mobile station includes a biometric information capturing element, wherein the user-provided biometric information is captured by the biometric information capturing element. In some such embodiments, the biometric information capturing element comprises a built-in fingerprint scanner or camera device.

In some embodiments, the computer-executable instructions, when executed, further cause configuration of a virtual machine to host the virtual eUICC. In some such embodiments, the computer-executable instructions, when executed, cause configuration of the virtual machine by causing: initialization of a data storage module of the virtual machine with the user-provided biometric information as a parameter to create encryption, decryption, and signature keys; loading of the data storage module upon each device boot-up; encryption and decryption of data associated with the virtual machine using the encryption and decryption keys; digital signing of data associated with the virtual machine using the signature key; and storage of the digitally signed data in a storage memory. In this regard, the digitally signed data may comprise at least one of a GSM file system, one or more Java Card applications, or one or more network authentication keys, wherein the digitally signed data is formatted into data blocks. In one embodiment, the storage memory maintains the data blocks in a journaling file system. Additionally or alternatively, digitally signing the data comprises signing checksums or hashes of the data with the signature key. Moreover, digitally signing the data may include calculating redundancy check values for the data, and signing the redundancy check values with random keys.

In another example embodiment, a method is provided for communicating with a plurality of cellular networks. The method includes providing a mobile device having a modem and at least one antenna configured to communicate with a plurality of cellular networks, and configuring a mobile application running on a processor to facilitate communication between the modem and a virtual reprogrammable universal integrated circuit chip (eUICC) that is not physically or electrically connected to the modem, wherein security of the virtual eUICC is maintained using user-provided biometric information.

In some embodiments, the mobile device further includes a biometric information capturing element, and wherein the method includes capturing the user-provided biometric information using the biometric information capturing element. In some such embodiments, the biometric information capturing element comprises a built-in fingerprint scanner or camera device.

In some embodiments, the method includes causing configuration of a virtual machine to host the virtual eUICC. In this regard, causing configuration of the virtual machine includes causing: initialization of a data storage module of the virtual machine with the user-provided biometric information as a parameter to create encryption, decryption, and signature keys; loading of the data storage module upon each device boot-up; encryption and decryption of data associated with the virtual machine using the encryption and decryption keys; digital signing of data associated with the virtual machine using the signature key; and storage of the digitally signed data in a storage memory. For instance, the digitally signed data may comprise at least one of a GSM file system, one or more Java Card applications, or one or more network authentication keys, and the digitally signed data may be formatted into data blocks. Additionally or alternatively, the method may include maintaining the data blocks in a journaling file system in the storage memory.

In some embodiments, digitally signing the data comprises signing checksums or hashes of the data with the signature key. In some embodiments, wherein digitally signing the data comprises calculating redundancy check values for the data, and signing the redundancy check values with random keys.

In yet another example embodiment, one or more non-transitory computer-readable media storing computer-executable instructions are provided that, when executed by a mobile station having a modem and at least one antenna configured to communicate with a plurality of cellular networks, cause the mobile station to configure a mobile application running on a processor to facilitate communication between the modem and a virtual reprogrammable universal integrated circuit chip (eUICC) that is not physically or electrically connected to the modem, wherein security of the virtual eUICC is maintained using user-provided biometric information.

In some embodiments, the mobile station further includes a biometric information capturing element, and the user-provided biometric information is captured by the biometric information capturing element. In this regard, the biometric information capturing element comprises a built-in fingerprint scanner or camera device.

In some embodiments, the computer-executable instructions, when executed by the mobile station, further cause the mobile station to cause configuration of a virtual machine to host the virtual eUICC. In this regard, the computer-executable instructions, when executed by the mobile station, cause the mobile station to cause configuration of the virtual machine by causing: initialization of a data storage module of the virtual machine with the user-provided biometric information as a parameter to create encryption, decryption, and signature keys; loading of the data storage module upon each device boot-up; encryption and decryption of data associated with the virtual machine using the encryption and decryption keys; digital signing of data associated with the virtual machine using the signature key; and storage of the digitally signed data in a storage memory. In this regard, the digitally signed data may comprise at least one of a GSM file system, one or more Java Card applications, or one or more network authentication keys, and the digitally signed data may be formatted into data blocks. Additionally, the storage memory may maintain the data blocks in a journaling file system.

In some embodiments, digitally signing the data comprises signing checksums or hashes of the data with the signature key. In some embodiments, digitally signing the blocks comprises calculating redundancy check values for the data, and signing the redundancy check values with random keys.

The above summary is provided merely for purposes of summarizing some example embodiments to provide a basic understanding of some aspects of the present invention(s). Accordingly, it will be appreciated that the above-described embodiments are merely examples and should not be construed to narrow the scope or spirit of the invention in any way. It will be appreciated that the scope of the invention(s) encompasses many potential embodiments in addition to those here summarized, some of which will be further described below.

BRIEF DESCRIPTION OF THE DRAWINGS

Figure 1:
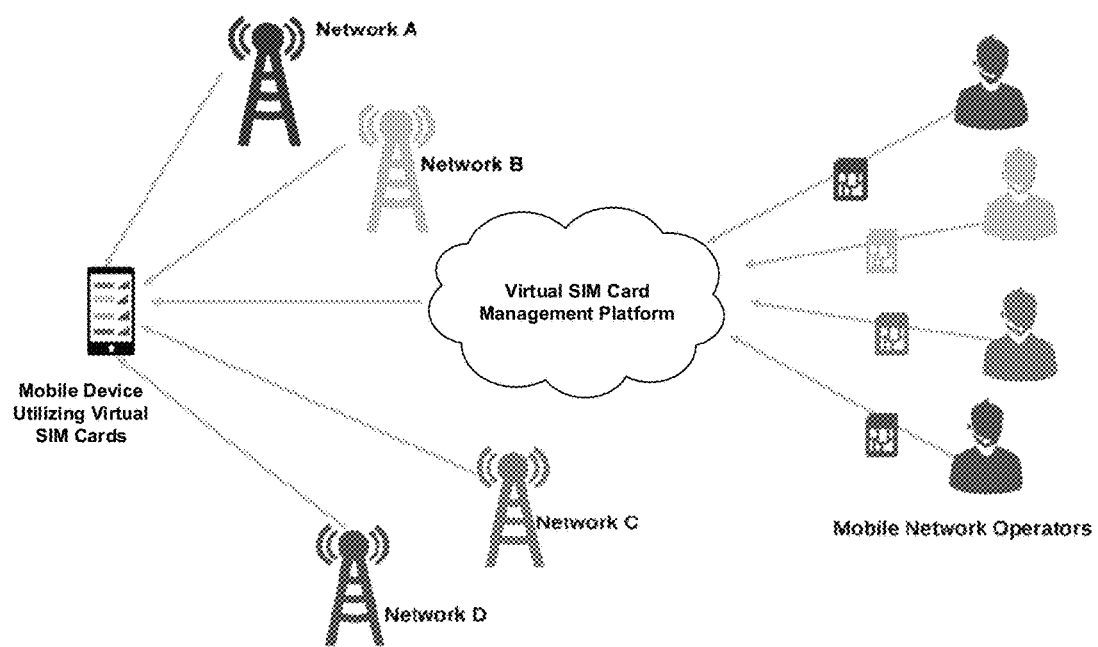
Figure 2:
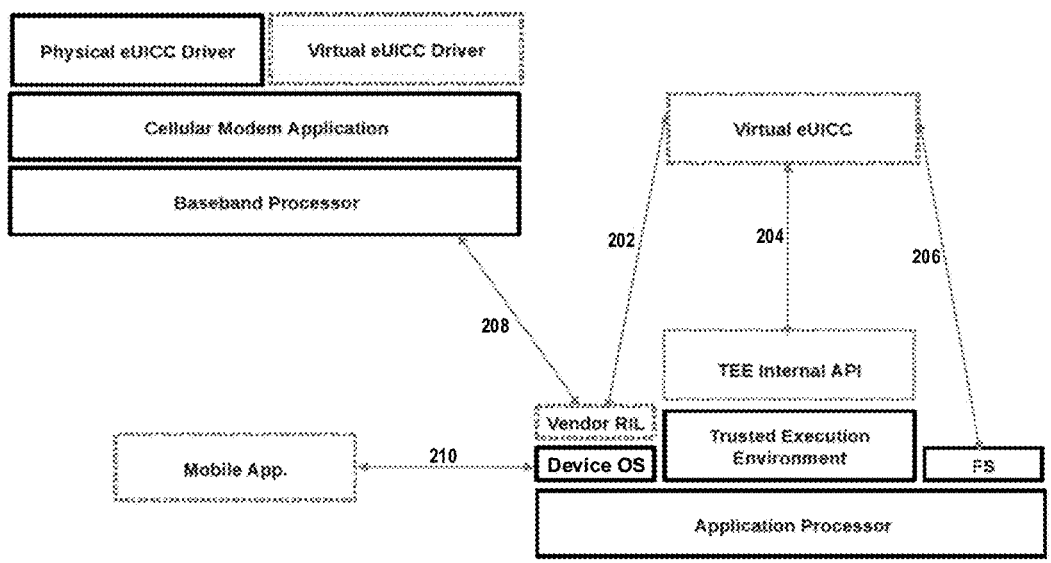
Figure 2A:
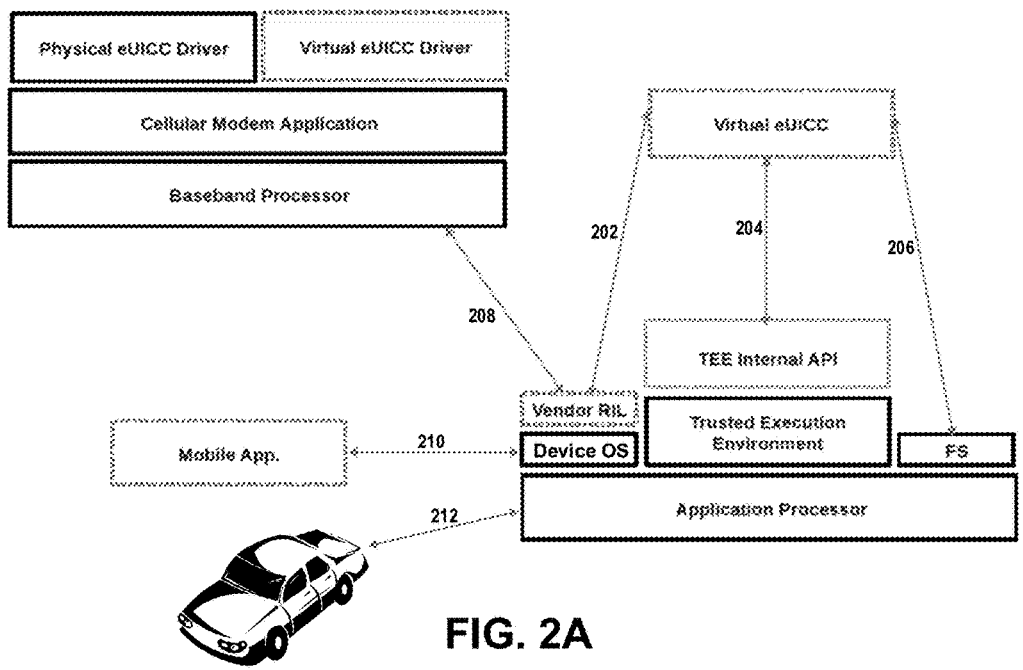
Figure 2B:
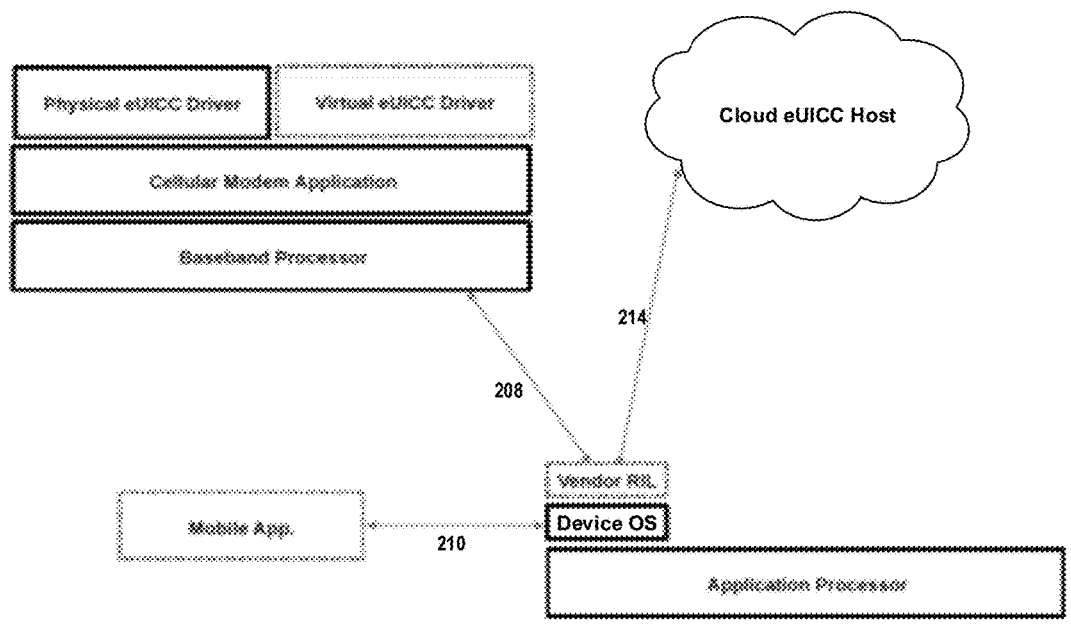
Figure 3:
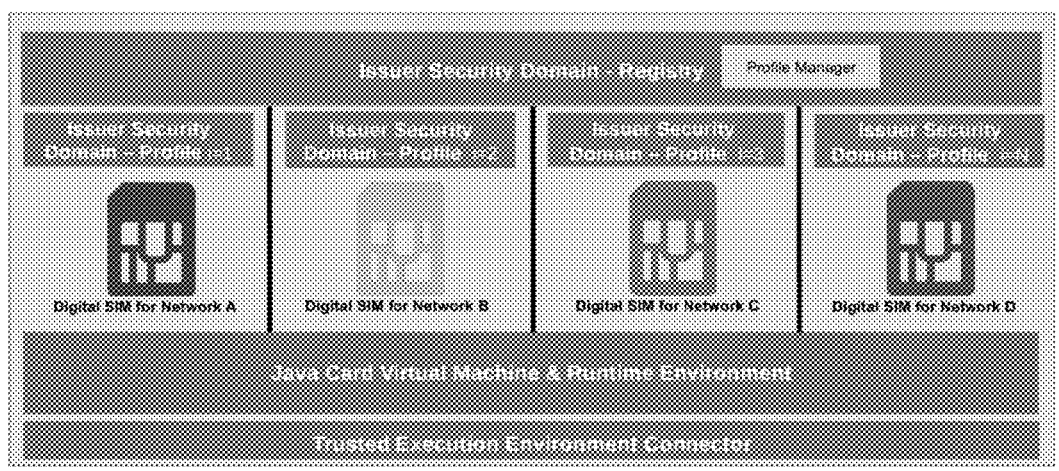
Figure 4:
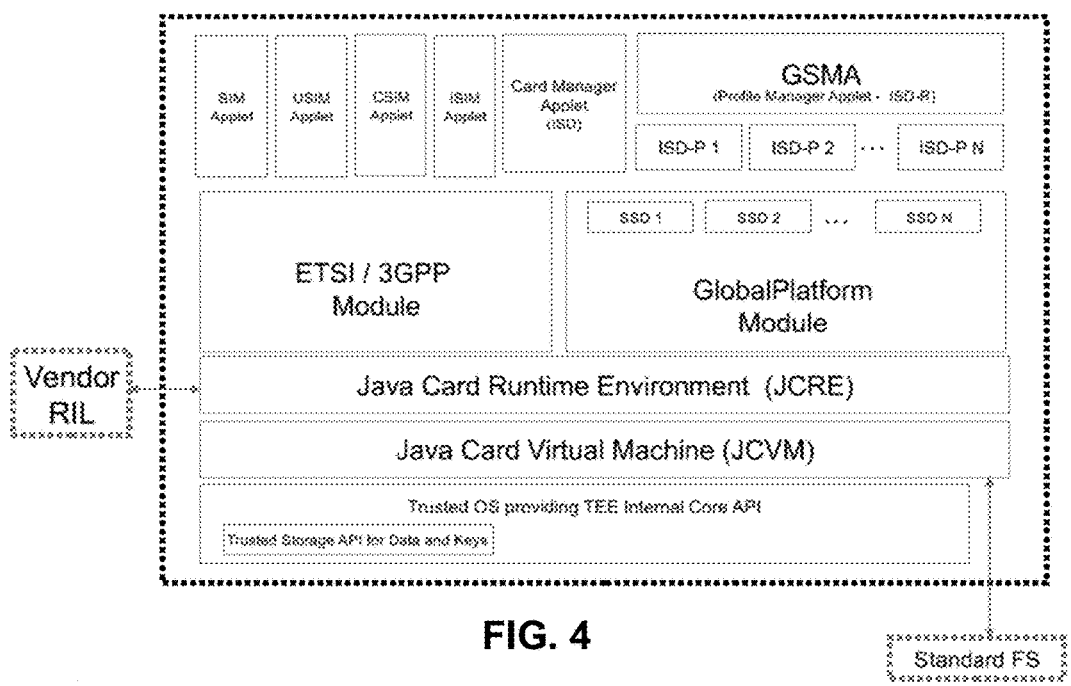
Figure 5:
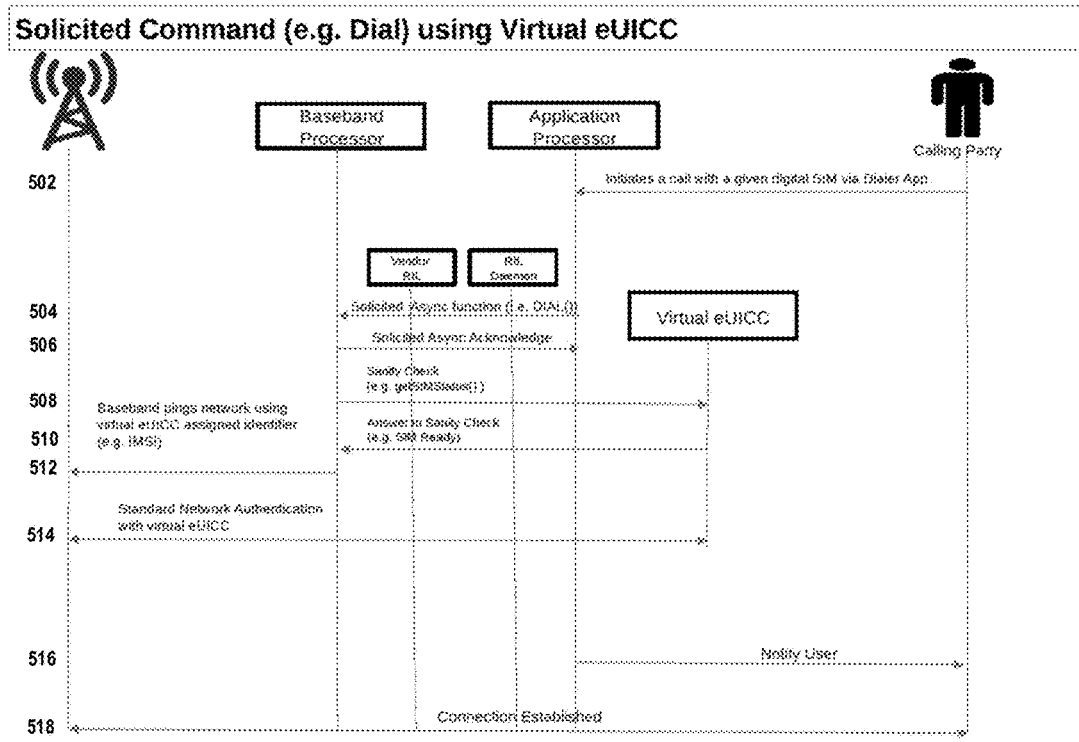
Figure 6:
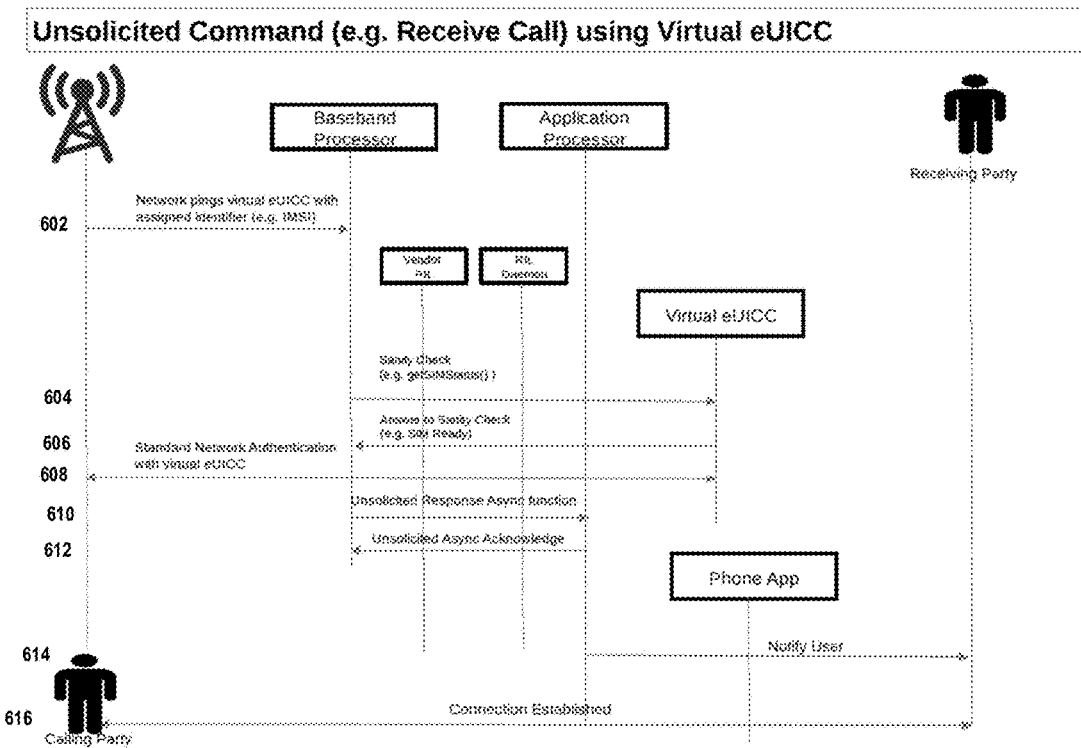
Figure 7:
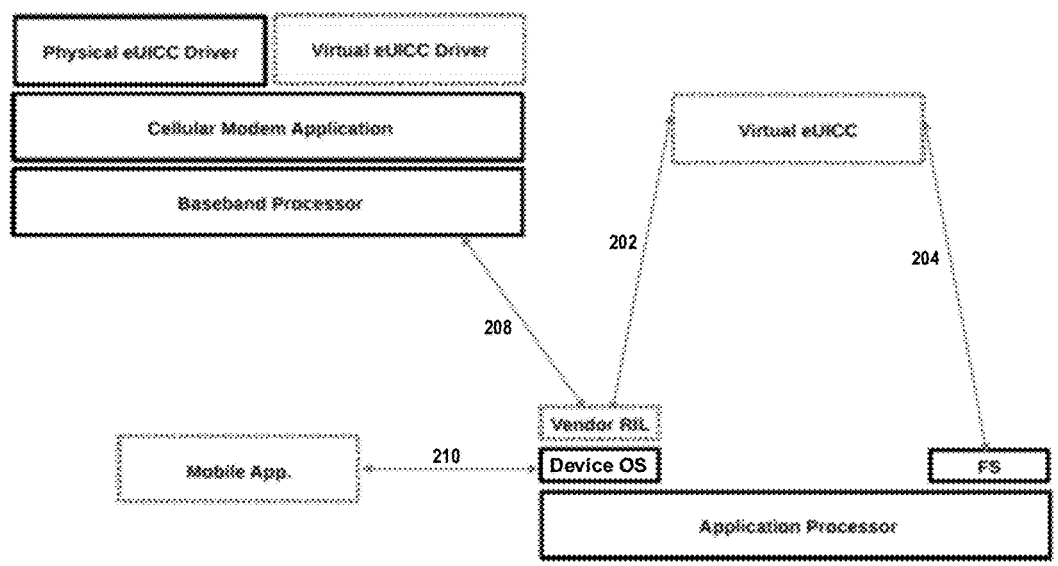
Figure 8:
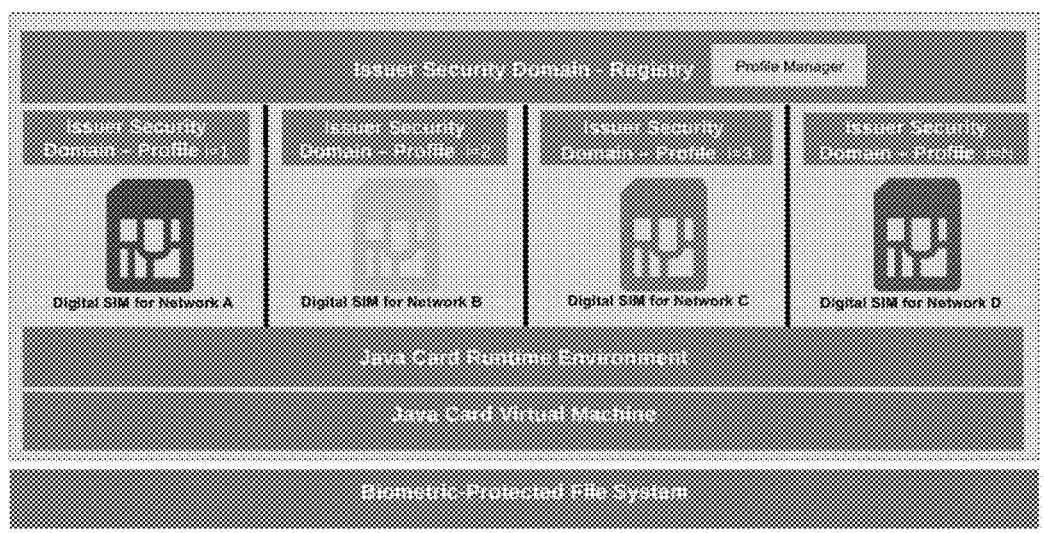
Figure 9:
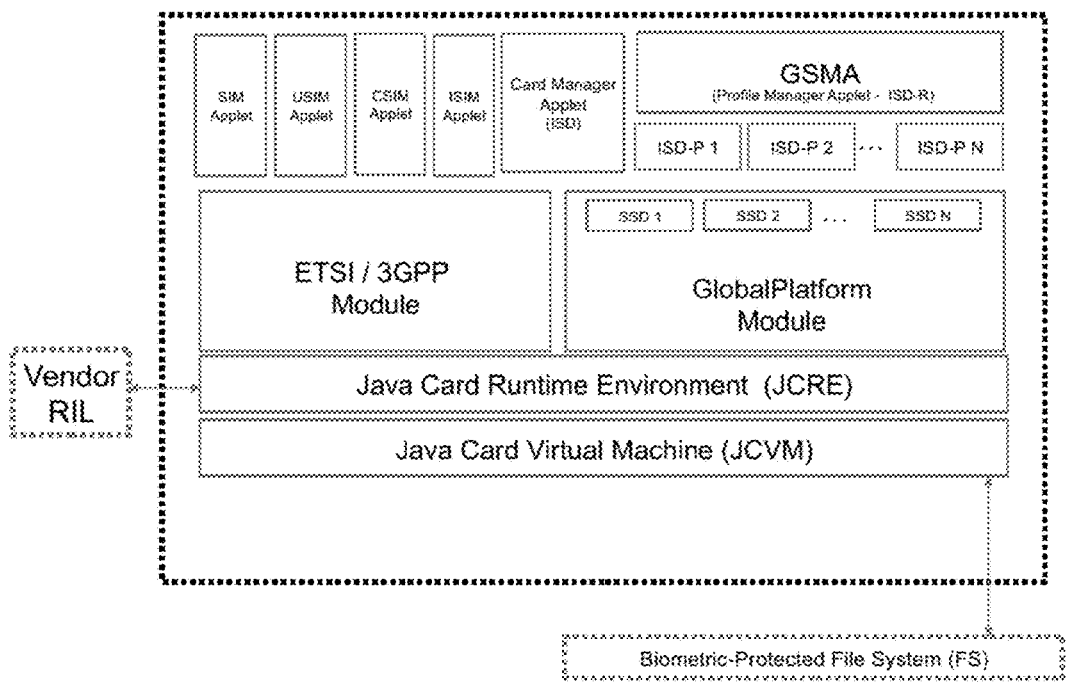
Figure 10:
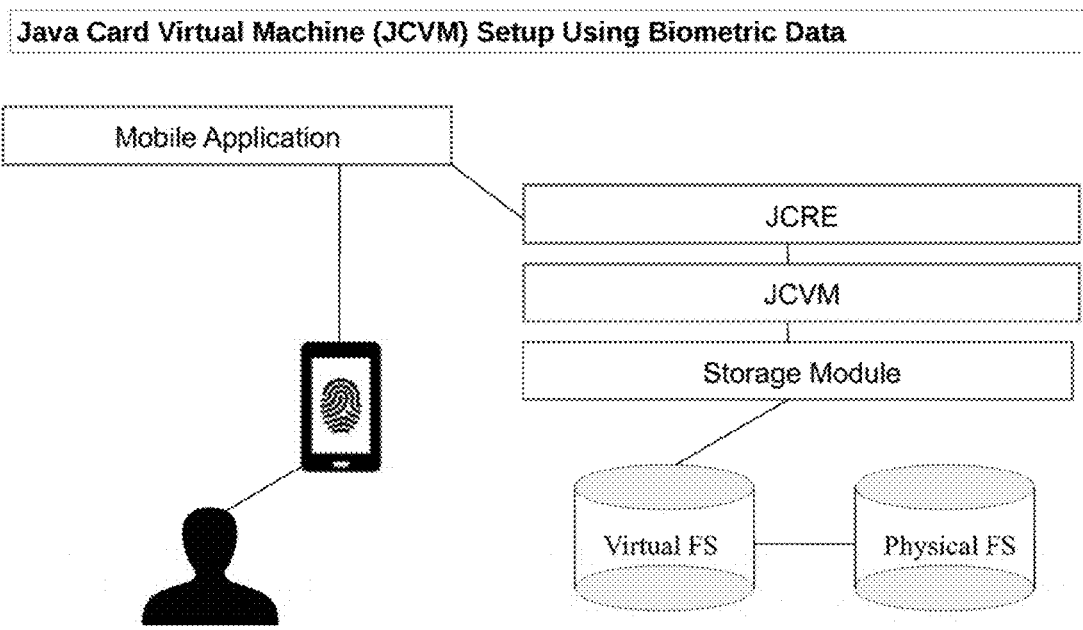
Figure 11:
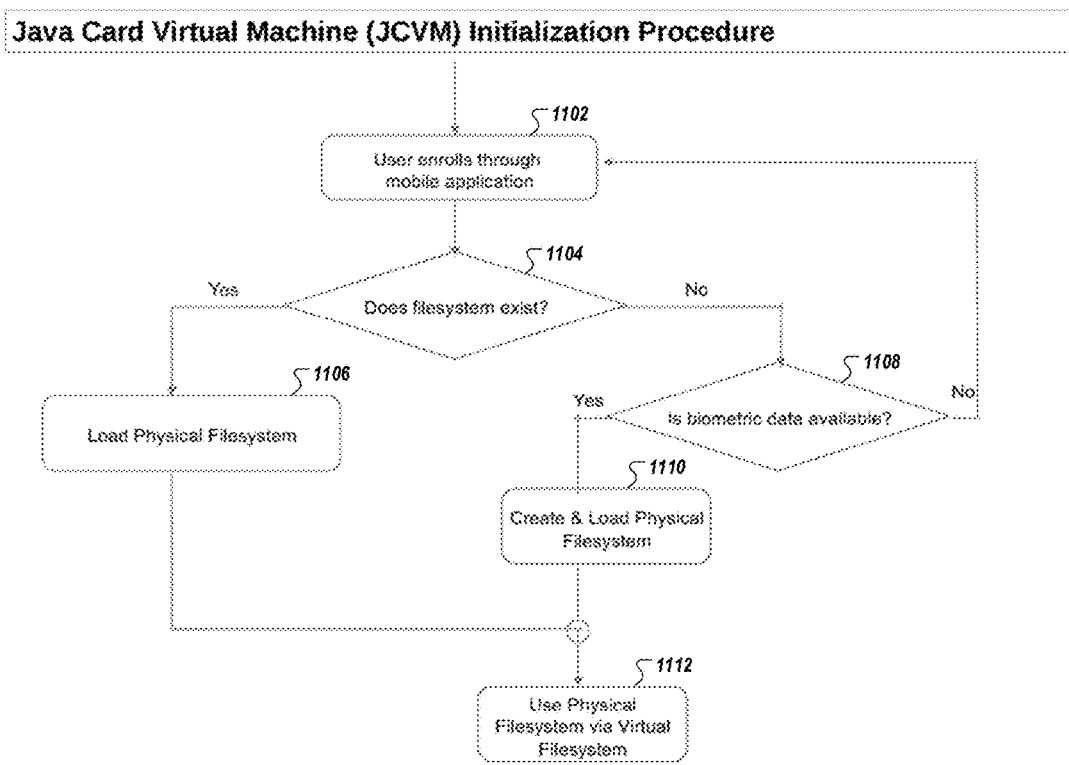
Figure 12:
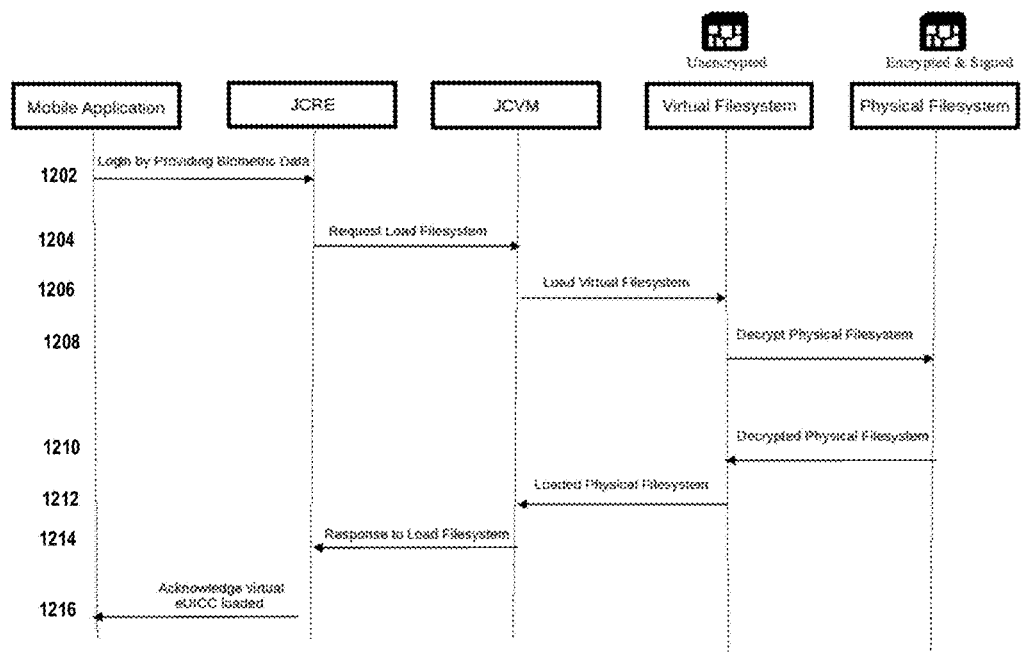
Figure 13:
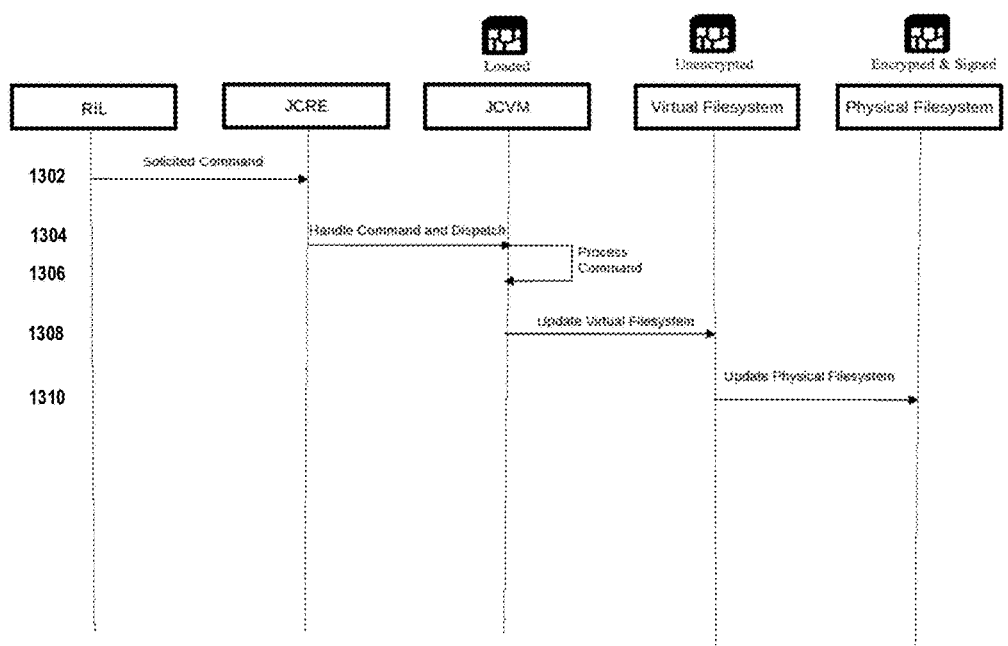

Having thus described the example embodiments of the invention in general terms, reference will now be made to the accompanying drawings, which are not necessarily drawn to scale, and wherein:

FIG. 1 provides a high-level system overview of an end-to-end virtual SIM platform, in accordance with example embodiments described herein;

FIG. 2 illustrates an overview of an example internal device configuration of a virtual eUICC, in accordance with example embodiments described herein;

FIG. 2A illustrates one use-case contemplated herein, in accordance with example embodiments described herein;

FIG. 2B illustrates an additional system configuration, in which virtual eUICCs are hosted by a cloud provider, in accordance with example embodiments described herein;

FIG. 3 illustrates a high-level view of the virtual eUICC, in accordance with example embodiments described herein;

FIG. 4 illustrates the internal software architecture of a virtual eUICC, in accordance with example embodiments described herein;

FIG. 5 illustrates a sequence diagram for a solicited command (e.g. DIAL), in accordance with example embodiments described herein;

FIG. 6 illustrates a sequence diagram for transmission of an unsolicited command (e.g. RECEIVE CALL), in accordance with example embodiments described herein;

FIG. 7 illustrates an internal overview of the configuration of a connected device using a virtual eUICC without a Trusted Execution Environment (TEE), in accordance with example embodiments described herein;

FIG. 8 illustrates a high-level view of a virtual eUICC, in accordance with example embodiments described herein;

FIG. 9 illustrates the internal software architecture of a virtual eUICC, in accordance with example embodiments described herein;

FIG. 10 illustrates the high-level overview of a Java Card Virtual Machine (JCVM) setup using biometric information provided by the end-user, in accordance with example embodiments described herein;

FIG. 11 illustrates a flowchart of a JCVM file system initialization, in accordance with example embodiments described herein;

FIG. 12 illustrates an exemplary process flow for a JCVM during data loading, in accordance with example embodiments described herein; and FIG. 13 illustrates an exemplary process flow for a JCVM during data update, in accordance with example embodiments described herein.

DETAILED DESCRIPTION

Some embodiments will now be described more fully hereinafter with reference to the accompanying drawings, in which some, but not necessarily all contemplated embodiments are expressly illustrated. Indeed, the inventions contemplated herein may be embodied in many different forms and should not be construed as limited to the embodiments set forth herein; rather, these embodiments are provided so that this disclosure will satisfy applicable legal requirements. Like numbers refer to like elements throughout.

As defined herein, a "computer-readable storage medium," which refers to a non-transitory physical storage medium (e.g., volatile or non-volatile memory device), can be differentiated from a "computer-readable transmission medium," which refers to an electromagnetic signal.

It will be understood that each software operation described herein may be implemented by various means, such as hardware, firmware, processor, circuitry, and/or other devices associated with execution of software including one or more computer program instructions. For example, one or more of the procedures described herein may be embodied by computer program instructions. In this regard, the computer program instructions which embody the described procedures may be stored by a memory of an apparatus and executed by a processor of the apparatus. As will be appreciated, any such computer program instructions may be loaded onto a computer or other programmable apparatus (e.g., hardware) to produce a machine, such that the resulting computer or other programmable apparatus implements the particular functions specified. These computer program instructions may also be stored in a computer-readable memory (e.g., a computer-readable storage medium) that may direct a computer or other programmable apparatus to operate in a particular manner, such that the instructions stored in the computer-readable memory produce an article of manufacture, the execution of which implements the specified functions. The computer program instructions may also be loaded onto a computer or other programmable apparatus to cause a series of operations to be performed on the computer or other programmable apparatus to produce a computer-implemented process such that the computer program instructions executed on the computer or other programmable apparatus cause the performance of operations for implementing the specified functions.

Turning first to FIG. 1, a high-level system overview of an end-to-end virtual SIM platform is illustrated. As shown in FIG. 1, embodiments contemplated herein enable a single device to connect to a plurality of different networks (e.g., Networks A through D) using a series of virtual SIM cards stored in an eUICC. In turn, a virtual SIM card management platform (referred to herein as an MNOHub server) facilitates the provisioning (e.g., purchase, activation, deactivation, and deletion, or the like) of the virtual SIM cards. The virtual SIM card management platform further communicates with a variety of MNOs or MVNOs associated with several of the networks available to the device and that offer the various virtual SIM cards for sale.

In U.S. Non-Provisional patent application Ser. No. 14/856,974, filed Sep. 17, 2015, apparatuses, systems and a set of methods are described that enable the virtualization of physical SIM cards using a plurality of concurrent eUICCs. Devices implementing such concepts may be connected devices such as IoT devices, or in some embodiments mobile stations that may comprise cellular telephones or which may otherwise be operated by users, as disclosed in U.S. Non-Provisional patent application Ser. No. 14/856,974, filed Sep. 17, 2015. These patent applications describe example mobile stations or connected devices may comprise a "SIM-less" System-on-Chip (S2oC) with integrated reprogrammable cellular network connectivity.

Example embodiments disclosed herein provide an extension of this S2oC architecture and comprise configurations for fully emulating an eUICC in a connected device's operating system running on the application processor. More specifically, some example embodiments include an on-die virtual (i.e., software-based) eUICC running on a dedicated application processor of a system-on-chip.

Traditional architectures connect hardware-based eUICCs with a baseband processor (and not the application processor). In turn, virtualized eUICCs might presumably be hosted by the baseband processor as well. However, baseband processors are not equipped with much memory, which limits the ability to store eUICCs thereon. Similarly, baseband processors traditionally provide a relatively small physical footprint, thus reducing the ability for modification or addition of new components. Moreover, baseband processors must typically be certified by national bodies (in the U.S., for instance, they are certified by the PTCRB). Finally, baseband processors typically have limited amounts of random access memory, thus placing a ceiling on the performance of baseband processor operations. Accordingly, as described herein, several example embodiments store virtual eUICCs on the application processor. Because application processors have more random access memory, this change can reduce virtual SIM provisioning time from the roughly 30 seconds or 1 minute, as is typical in traditional physical eUICC provisioning, to a matter of 1 or 2 seconds for a virtual eUICC hosted by the application processor. Some example architectures supporting the redesign of eUICC location are described herein. Perceived drawbacks of hosting virtual eUICCs in an application processor (e.g., security concerns) are also addressed through heightened security functionality, as described below.

As shown in FIG. 2, in some example embodiments of a connected device, the Baseband Processor (BP) is connected to the Application Processor (AP) through a physical interface (e.g., a serial port, a dedicated bus, or the like). The BP might be connected to the physical eUICC through a standard driver developed by the cellular modem vendor. The AP may run a rich UI OS (e.g., Android) including a mobile application dedicated to managing the virtual eUICC content. The AP may further include a Trusted Execution Environment (TEE), which allows the connected device securely run trusted applications. These trusted applications may have access to securitized data storage that would have normally been available to other applications running in the AP. One of the trusted applications may, in these embodiments, be described as the virtual eUICC, and a high-level logical view of one such virtual eUICC is provided in FIG. 3. It should be understood that in some embodiments, there may exist a plurality of virtual eUICCs in the same connected device. In embodiments with one or more virtual eUICC as illustrated herein, a routing mechanism, such as is disclosed above, may further be reused.

As shown in FIG. 2, element 202 may comprise a secure channel for communicating via a virtual eUICC driver protocol, element 204 may comprise a secure channel for secure data storage access via a TEE Internal API, and element 206 may comprise a secure channel for password-based data storage via a standard File System (FS) API. Further, element 208 illustrates AP-BP communication, which may occur via standard and/or proprietary AT commands (e.g., AT+CSIM, AT % VSIM, or the like) using a vendor radio interface layer (RIL). Finally, element 210 illustrates virtual eUICC access via a SIM Alliance API (e.g., SEEK).

In some embodiments, it may be the case that communication is possible between the connected device and a separate connected device. For instance, when a user takes a smartphone into a vehicle, it may be the case that the vehicle includes a cellular modem and an antenna and can communicate with the user's smartphone using, for instance, the remote Sim Access Profile (SAP) API. In such embodiments, the virtual eUICC concept contemplated herein may still operate in the fashion as shown above. This design is illustrated in FIG. 2A, in which the connected device (e.g., the user's smartphone) is in communication with a separate connected device (here, a vehicle) via element 212, which may utilize Bluetooth™ or another type of short-range communication technology.

Turning now to FIG. 4, example internal software architecture of a virtual eUICC is illustrated, in accordance with example embodiments described herein. As shown in FIG. 4, in some embodiments the virtual eUICC is based on an optimized implementation of the Java Card Virtual Machine (JCVM) specifications, and thus support the concept of firewalls. The virtual eUICC may include a Java Card Runtime Environment (JCRE) to run Java Card applications, commonly referred as applets. The JCRE is the entry point for communicating with the virtual eUICC.

In some embodiments, the virtual eUICC includes an implementation of GlobalPlatform card specifications, and in such embodiments the connected device thus supports the concept of Security Domains that essentially allows the secure sandboxing of a group of applets.

The virtual eUICC includes an implementation of the ETSI/3GPP specifications that provide the necessary framework for running SIM, USIM, and ISIM applets and other Network Access Applications (NAAs) used by network operators.

The virtual eUICC may further include a custom profile manager applet which leverages the Security Domain configuration to allow the eUICC to contain multiple network operators' profiles at the same time, such as the profile manager applet described in greater detail in U.S. Non-Provisional patent application Ser. No. 14/856,974, filed Sep. 17, 2015.

The JCRE may be configured to provide an implementation of the virtual eUICC interface (e.g., S2OC_UICC_CONTROLLER.H). This interface is then called by the Radio Interface Layer (RIL) module of the connected device. The RIL module is configured to support both physical and virtual UICCs. The end-user of the connected device will have the option to enable the eUICC through a rich OS UI (e.g., a Settings app).

Some example embodiments also enable the RIL to support a dual-SIM (or a multi-SIM) configuration provided that the cellular modem supports it. In fact, one embodiment contemplated herein may be applied to a retrofitted Dual SIM Dual Standby (DSDS) or Dual SIM Dual Active (DSDA) device whereby one SIM card slot is assigned to the virtual eUICC while the baseband processor's firmware is configured to take into account such configuration.

As noted above, element 208 illustrates that the RIL communicates with the cellular modem (i.e., the baseband processor) via AT commands (also referred to as the Hayes command set). It is also noted that a high-level protocol abstracting AT commands can be used (e.g., Qualcomm's MSM Interface (QMI), which is Qualcomm's proprietary interface for communicating with Qualcomm Mobile Station Modems).

AT commands have been used since 1981 and still consist of a series of short text strings which are combined together to produce complete commands for operations such as dialing, hanging up, and changing the parameters of a connection. However, many vendors have introduced advanced proprietary features that extend basic AT commands. Implementing these proprietary features or any standard AT command in Android for instance, requires the OEM to provide an implementation of the Radio Interface Layer (RIL) interface (ril.h). To do this, an OEM would provide a library (ril.so) specific to its cellular modem vendor that implements such interface.

However, it has been observed that RIL integration is very complicated and programmers historically have continued to utilize AT commands in source code, which produces inflexibility.

In this regard, such example embodiments may further use additional AT commands to minimize the integration work a cellular modem application vendor. However, for this to work, the cellular modem application vendor needs to develop a virtual driver that can communicate, using AT commands, with the external virtual eUICC hosted on the application processor. An example of one such driver protocol includes commands such as those illustrated in Table 1 below.

Modem Application, which already has knowledge of the existence of the virtual eUICC, sends an unsolicited command to the RIL. In operation 508, the Cellular Modem Application sends a command requesting the status of the virtual SIM card (e.g., getSIMStatus( )), and in operation 510, the solicited response indicates the status of the virtual SIM card (e.g., SIM ready), and provides the International Mobile Subscriber Identity (IMSI) and Integrated Circuit Card ID (ICCID) associated with the identified virtual SIM card. It should be understood that operations 508 and 510 may be performed periodically (and thus may be performed prior to the call initiation process), after which the results may be cached by the Cellular Modem Application for later

TABLE 1

Virtual eUICC Driver Protocol

BP shall use unsolicited proactive commands to communicate with AP via RIL module (over serial, USB, etc . . . )
It consists of at least 8 new non-standard AT commands used in the virtual eUICC Driver:
1. %VSIMLIST Unsolicited Proactive Command to list all slots with virtual eUICCs;
2. AT%VSIMLIST=<slot 1>, <slot 2>, <slot 3>...<slot n>
3. %VSIMRESET:<slot #>, Unsolicited Proactive Command to reset the virtual eUICC and return ATR
4. AT%VSIMRESET=<length>,"<ATR>" AP resets virtual eUICC and returns ATR
5. %VSIMATR:<slot #> Unsolicited Proactive Command to return ATR
6. AT%VSIMATR=<length>,"<ATR>" AP returns ATR
7. %VSIMAPDU:<slot #>,<length>,"<C-APDU>" Unsolicited Proactive Command to forward C-APDU to virtual eUICC
8. AT%VSIMAPDU=<length>,"<R-APDU" AP returns R-APDU
Examples: [SELECT DF GSM & GET RESPONSE]
%VSIMAPDU:1,14,"A0A40000027F20"
AT%VSIMAPDU=1,48,"000010247F20000000000091100160800838A838A9000"
[RUN GSM ALGORITHM & GET RESPONSE]
%VSIMAPDU:1,42,"A0B8000010FPFPFPFPFPFPFPFPFPFPFPFPFPFPFPFP"
AT%VSIMAPDU=28,"AS975E88E0940FC09AEFA0009000"

When the Cellular Modem application boots up, it is informed by the AP that a virtual eUICC is connected to the device. This notification could be performed, for instance, with a % VSIMLIST command. This command appears to the Application Processor, and more specifically to the RIL as an unsolicited command. The RIL maintains the list of virtual eUICCs slots available for the device. The RIL would return the list of available virtual eUICCs.

The virtual eUICC is then detected by a Cellular Modem Application (which is also referred to as the trusted baseband client, although when referred to as a Cellular Modem Application, this element is explicitly described as running on a dedicated baseband processor) by sending a % VSIMRESET to the RIL to "power up" the virtual eUICC and retrieve its pre-configured Answer to Reset (ATR) data.

When a cellular network requires authentication with the virtual eUICC, the Cellular Modem Application sends an unsolicited command to the RIL which encapsulates a message to the virtual eUICC. For example, for a 2G network authentication, it could consist of explicitly selecting the dedicated file for GSM (DF GSM) via % VSIMAPDU:1,14,"A0A40000027F20" and requesting to run standard the GSM algorithm % VSIMAPDU:1,42, "A088000010FFFFFFFFFFFFFFFFFFFFFFFFFFFFFFFF." The response to these encapsulated commands is received through solicited commands to the Cellular Modem application via AT % VSIMAPDU.

Turning now to FIG. 5, a sequence diagram is provided illustrating a series of events for placing a phone call by the end-user using a specific virtual eUICC. In operation 502, the end-user initiates a call with a given virtual SIM card using a Dialer App. In operation 504, the RIL sends a solicited command to the Cellular Modem Application to dial the given mobile number. In operation 506, the Cellular use. Subsequently, in operation 512, the Cellular Modem Application pings the corresponding network using an IMSI associated with the identified virtual SIM card. In response, in operation 514, standard network authentication may occur between the virtual SIM card and the network. In operation 516, the user may be notified of the status of the call, and finally, in operation 518, the connection may be established.

As shown in FIG. 6, a sequence diagram is provided demonstrating a series of events for receiving a phone call by the end-user through a specific virtual eUICC. In operation 602, a network may ping the Cellular Modem Application of a connected device. In operation 604, the Cellular Modem Application sends a command requesting the status of the virtual SIM card (e.g., get SIMStatus( )), and in operation 606, the solicited response is returned indicating the status of the virtual SIM card (e.g., SIM ready). In response, in operation 608, standard network authentication may occur between the virtual SIM card and the network. In operation 610, the Cellular Modem Application, may send an unsolicited command to the RIL. Subsequently, in operation 612, the RIL may return an unsolicited command. In operation 614, the user may be notified about the status of the call, and finally, in operation 616, the connection may be established.

It is already anticipated that security would be the reason many opponents of the introduction of virtual eUICCs into the industry would reference as their main reason for objection. However, one can point out that the financial industry is already allowing consumers to make very large financial transaction on mobile devices without the requirement of a physical secure element. Furthermore, the TEE is rapidly appearing to become a secure foundational block which could be leveraged by a virtual eUICC. In some example embodiments contemplated herein, the use of physically unclonable functions (PUFs) adds another layer of security to the pre-existing TEE container specifically for a virtual eUICC. An example PUF may use noisy signal sources such as biometric data. For instance, on an iPhone, this might include using the fingerprint scanner to create the virtual eUICC. The end-user could download a new iOS firmware upgrade which includes an updated Cellular Modem Application and a dedicated mobile application. Upon completion of the registration process by the end-user, the mobile application could trigger launching of the fingerprint scanner screen that may be used by an end-user. After the biometric matching process, the virtual eUICC is activated and will, throughout its lifespan, only be usable by this particular end-user. The use of biometric information to enhance security is described in greater detail below.

The Cellular Modem Application may further have a PGP-like key loaded into it upon a firmware upgrade or first installation. The virtual eUICC may also be initialized with its own PGP-like key. The Cellular Modem's PGP-like key can be used by the virtual eUICC to transmit data to the Cellular Modem Processor. Similarly, the virtual eUICC's PGP-like key can be used by the Application Processor to send data to it. The virtual eUICC library can be a trusted application that is either preloaded or installed remotely into the TEE. To add a layer of pseudo-tamper resistance, the virtual eUICC software may also be signed with the managing entity's private certificate. The managing entity (e.g., a MNO hub server) may then be required to activate the virtual eUICC before it can be used. It could also perform an integrity check at a new management operation (e.g. installing a new digital SIM). The activation mechanism of the virtual eUICC is based on a mutual-authentication session between the JCRE and the managing entity's servers. To prevent cloning, the entity managing the virtual eUICCs retrieves the IMEI of the host device in advance and stores it in its databases of virtual eUICCs hosts. The managing entity then generates a random virtual eUICC ID (EID) and links it to the said IMEI. The serial number of the cellular modem is also retrieved. These parameters are fed into the JCRE at first boot-up and activation.

In this fashion, example embodiments provide a mechanism for virtualizing an eUICC running on an application processor and accessed by the baseband processor indirectly. It is noted that such configuration could be further enhanced whereby the virtual eUICC is running in the cloud, as shown in FIG. 2B. Specifically, as opposed to the arrangement described in FIG. 2, use of a TEE and FS are not necessary in a cloud embodiment of this nature, because the application processor itself does not host the virtual eUICC(s). Moreover, in a cloud embodiment, the remote eUICC host may utilize a secured data center to store information regarding the virtual eUICC(s), such as by using a Hardware Security Module (HSM) or other heightened security system. Accordingly, rather than utilizing an internal secure channel 202 to communicate with the virtual eUICC, the application processor may utilize channel 214 to communication with the external cloud host using a virtual eUICC driver protocol. In such embodiments, if a cloud-based virtual eUICC is not associated with a bootstrap profile, then this communication may be facilitated by establishment of a Wi-Fi connection enabling communication with the remote cloud to perform the Sanity Check and retrieve the relevant IMSI. If there is a bootstrap profile associated with the cloud-based virtual eUICC, then the Vendor RIL can cause communication directly with the cloud host via the bootstrap profile to perform the Sanity Check and retrieve the relevant IMSI. Implementation of a cloud-based virtual eUICC embodiment carries a number of benefits by reduction of the burden on the application processor. Moreover, the security of the cloud host could be much more robust than the security of the connected device itself, thus further reducing the remaining risk that a malicious party could tamper with eUICC-related information. In yet another embodiment, there may be local virtual eUICC(s) as well as remotely hosted virtual eUICC(s).

As noted briefly above, biometric information may be utilized to provide an additional or alternative layer of security to the TEE (or cloud-based) security concepts described above. For instance, in some example embodiments described can utilize biometric information to secure a virtual eUICC running on an application processor is contemplated for situations where a trusted execution environment (TEE) is not available, as illustrated in the design configuration shown in FIG. 7. It will be understood, however, that similar mechanisms can be used to further enhance the security of a mobile device that already utilizes a TEE. In a similar fashion, the use of biometric information can enhance the security of mobile devices that access an external virtual eUICC host (e.g., a cloud host). In each of these example scenarios, example embodiments may utilize biometric information in conjunction with an encrypted file system to secure the virtual eUICC. Such embodiments can thus protect the integrity of an eUICC by relying on the unclonable characteristics of biometric data (e.g., a fingerprint, facial image, or the like). In some embodiments, such unclonable characteristics may also utilize other sensor information such as accelerometer and/or gyroscope data while requiring the end-user to perform a set of movements known only to the end-user (e.g., shaking the mobile device in a certain pattern).

In this regard, there are numerous types of biometric data sources. In some embodiments, biometric data may be retrieved from a built-in fingerprint scanner. In other embodiments, biometric data may be retrieved from a built-in camera for facial image recognition. Those skilled in the art can appreciate how additional types of biometric information may be retrieved from an end-user using that end-user's mobile terminal.

In embodiments where an end-user's mobile device hosts a virtual eUICC, the end-user can enable use of biometric security by downloading, into the end-user's mobile terminal, a firmware update which includes an updated Cellular Modem Application and a dedicated mobile application and its associated virtual eUICC. During the registration process (enrollment) by the end-user, the mobile application triggers a biometric information retrieval process. The specific process utilized can be selected by the mobile application by automatically querying the functionality of the end-user's mobile terminal.

Biometric Data Retrieved from Built-in Fingerprint Scanner:

A fingerprint scanner is a stock element of modern iPhones, but other mobile OS-based devices (Android, Tizen, Windows, etc.), including Samsung's Galaxy devices, may also provide fingerprint scanners. In some embodiments, the end-user is presented with a menu to touch the fingerprint scanner. The cellular device's operating system may use a secure and dedicated "data storage enclave" system, whereby the mobile application never accesses the actual biometric information because such information is provided to the operating system upon the first boot-up of the device during the standard configuration menu. However, a randomly generated signature is provided to the mobile application by the operating system. Such a randomly generated signature may be linked to the actual fingerprint data securely stored in the dedicated "data storage enclave".

Biometric Data Retrieved from Built-in Camera:

Most mobile terminals today include built-in cameras, and thus example terminals that could utilize biometric data retrieved from a built-in camera could utilize by an iPhone, or nearly any other OS-based devices (Android, Tizen, Windows, etc.) as well. In these embodiments, the end-user is presented a menu to take various pictures of their face. The particular pictures taken could consist of a specific pattern only known by the end-user. A "liveness" detection is performed during the capture of the facial images. The facial images can then be sent to a remote server (i.e., a managing entity), which would require access to a Wi-Fi connection, because cellular connectivity is not yet available from the virtual eUICC. Otherwise, another physical eUICC already configured to access a bootstrap cellular network may be used. In all cases, the remote server may securely store the facial images and returns a signature to the mobile application. In turn, this signature can then be linked to the facial images' pattern.

In example embodiments, after the biometric capture process, the end-user may be requested to provide a unique ID (e.g., an email address) and a secret password. The end-user may also then be asked to provide a unique government identification number. In India, for instance, such government identification can be the Aadhaar (a 12-digit individual identification number issued by the Unique Identification Authority of India (UIAI) on behalf of the Government of India). The government ID may be used by a managing entity as a reference that may be checked against a third party database.

It should be understood that the term managing entity, as used herein, refers to an off-device, external server, that may generally communicate with the virtual eUICC through the mobile application. For instance, in some embodiments the managing entity may comprise an MNOHUB server. The managing entity acts as the issuer of the virtual eUICC, and hence has the proper keys to remotely manage the virtual eUICC.

The virtual eUICC may then be activated and will only be usable, throughout its lifespan, by the end-user whose biometric signature was captured. The activation requires retrieving, by the JCRE of the virtual eUICC, additional configuration parameters such as a virtual eUICC ID, a device ID (e.g. IMEI), a user ID (e.g. email), a password (e.g. alphanumerical text) and biometric information (e.g. signatures of biometric data). FIG. 8 illustrates a high-level view of a virtual eUICC of this nature. In contrast to other similar example views of a virtual eUICC, in the example embodiments utilizing biometrics-based security, FIG. 8 illustrates the virtual eUICC is stored in a biometric-protected file system. In turn, FIG. 9 illustrates the internal software architecture of a virtual eUICC of this nature.

The Cellular Modem Application may further have a PGP-like key loaded into it upon a firmware upgrade or during initial installation. The virtual eUICC is also initialized with its own PGP-like key. The Cellular Modem's PGP-like key can be used by the virtual eUICC to transmit data to the Cellular Modem Processor. Similarly, the virtual eUICC's PGP-like key may be used by the Application Processor to send data to eUICC. To add a layer of pseudo-tamper resistance, the virtual eUICC software may be signed with the managing entity's private certificate.

The managing entity shall activate the virtual eUICC before it can be used. It shall also perform a full integrity check during a new management operation such as installing a new digital SIM card. The activation mechanism of the virtual eUICC is based on a mutual-authentication session between the JCRE and the managing entity, of the nature described previously above. To prevent cloning, the managing entity may retrieve the IMEI of the host device in advance and store it in its databases of virtual eUICCs' hosts. The managing entity may then generate a random virtual eUICC ID (EID) and link it to the said IMEI. The serial number of the cellular modem is also retrieved. These parameters are fed into the JCRE at first boot-up and activation. As previously described, the biometric signature may also be included in these parameters.

The manner by which the JCRE will work with the JCVM to secure the data storage and runtime execution of the virtual eUICC will now be described.

On boot-up, the JCRE passes, to the JCVM, the encryption/decryption keys of the Filesystem (FS), which will hereinafter be referred to as JCVM keys. This step is required for every boot-up activity of the device. As long the JCVM FS memory size is maintained at a reasonably small size (512 KB-1024 KB), the encryption/decryption time will not impact the performance of the system, and thus will preserve a seamless user-experience.

The FS may be one single relatively small file encrypted with the generated symmetric keys. In this embodiment, the keys may be based on the 256-bit Advanced Encryption Standard (AES). In other words, an instance of the virtual machine has its own dedicated storage and integrity keys. For an attacker to attempt cloning a plurality of JCVMs deployed in various cellular devices, the computing resources become very expensive as the encryption system is purposefully decentralized.

Every digital SIM downloaded to the virtual eUICC is signed with an integrity check (checksum). Upon loading of the digital SIM, the checksum is validated to ensure data integrity.

To avoid a brute force attack, the virtual eUICC may be configured so that the virtual machine locks itself until the managing entity unlocks it. The entry point of JCRE is protected from denial-of-service attacks by introducing a retry mechanism counter which, after a fixed amount of successive failed authentications, will temporarily deactivate the ability to retry until the managing entity reactivates it again. Such reactivation might require the end-user to provide their credentials including going through a biometric authentication process.

A multi-factor authentication scheme may also be utilized. The factors relied upon in ne such scheme may include who the user is (biometric signature), what they know (a username, password and a government issued ID), and what they have (the device). The JCVM keys are thus generated using the following formula: JCVM Keys=f (Biometric signature, Username, Password, Government ID, Device ID, Virtual eUICC ID, cellular modem ID)

Whenever the end-user changes the password, the JCVM updates its keys and reinitializes the filesystem before restoring it. The mobile application can be programmed to periodically force the user to change the password to help mitigate potential hacking issues.

Three constraints are utilized to create a secure container for the virtual eUICC:
  1. Secure Storage
  2. Tamper-Resistance
  3. Secure Bytecodes Secure Storage:

One example secure storage is created by serializing C++ objects (Master File, Dedicated File, Element Files, Java Card Applets) as defined in the JCVM into one file (FS) encrypted with randomly generated AES 256-bit keys. The virtual FS is an encrypted filesystem running in RAM using AES 256-bit keys with an initialization vector. The Physical FS is an encrypted filesystem using an external/internal storage system available to the application processor. It shall also employ a 256-bit AES encryption of files. All applet objects and data are serialized into the FS.

Tamper Resistance:

The tamper-resistance nature of the virtual eUICC is introduced to make it harder for an attacker to modify it. A passive measure such as obfuscation to make reverse engineering difficult can also be employed in some embodiments. To minimize the footprint of the software and mitigate its potential performance impact, an anti-tampering embodiment is employed whereby integrity checks are performed by either the mobile application or the managing entity.

Secure Bytecodes:

The JCVM bytecode interpreter runs secure bytecodes. This requires pre-processing applets before they are remotely stored into the virtual eUICC. The pre-processing mechanism is generally performed at the server level by the managing entity. An automated function allows the generation of encrypted bytecodes, which are then remotely transmitted (via the mobile application) to the virtual eUICC during the installation of a Java Card applet inside a digital SIM. To be able to interpret these bytecodes, the JCVM key is generated upon the boot-up information provided to the JCRE.

Turning now to FIG. 10, an illustration is provided of the high-level overview of an example JCVM setup using biometric information provided by the end-user. The end-user captures biometric information using the end-user's mobile station, and this biometric information is relayed to the mobile application.

Turning now to FIG. 11, an example flowchart illustrates JCVM file system initialization. The operations described in FIG. 11 may, for instance, be performed by the connected device (e.g., a mobile station). In operation 1102, the user enrolls through a mobile application on the user's connected device. This enrollment may be part of a registration process by the end-user, and may trigger a biometric information retrieval process. In operation 1104, the connected device determines whether a file system currently exists or not. In an instance in which a file system does exist, in operation 1106, the connected device uses the user's retrieved biometric information to load (and decrypt) the physical file system, and the procedure advances to operation 1112, in which the physical file system is used via a virtual file system. Alternatively, in an instance in which a file system does not exist, the procedure advances to operation 1108, in which the connected device determines whether biometric information is available. If not, then the procedure returns to operation 1102. If so, however, then the procedure advances to operation 1110, in which the connected terminal creates and loads a physical file system using the biometric information. Subsequently, the procedure advances to operation 1112, in which the physical file system is used via a virtual file system.

Turning now to FIG. 12, a sequence diagram is provided illustrating an exemplary process flow for a JCVM during data loading. In operation 1202, the mobile application transmits retrieved biometric information to the JCRE for the end-user to login. In operation 1204, the JCRE transmits a FS load request to the JCVM. In operation 1206, the JCVM transmits the biometric information to a virtual FS. Finally, in operation 1208, the biometric information is used to decrypt the physical FS. In response, the physical FS transmits a message back to the virtual FS indicating that decrypting has occurred in operation 1210. In operation 1212, the virtual FS relays the message to the JCVM. In operation 1214, the JCVM then transmits a message to the JCRE. Finally, in operation 1216, an acknowledgment is sent from the JCRE to the mobile application indicating that the biometric data has been loaded.

It should be understood that while the operations illustrated in FIG. 12 depict an example sequence of operations that may occur in some embodiments, there may be slight variations based on the design of the implementing system. For instance, when the mobile device utilizes a TEE, operations performed by the JCRE, JCVM and virtual FS may be condensed such that the biometric information may be transmitted to the TEE, which then transmits the biometric information directly to the physical FS stored within the TEE. The responsive transmissions may be similarly streamlined.

Turning to FIG. 13, a sequence diagram is provided illustrating an exemplary process flow for a JCVM during data update. In operation 1302, a radio interface layer transmits a solicited command to the JCRE. In operation 1304, the JCRE handles the solicited command and dispatches it to the JCVM. In operation 1306, the JCVM processes the command. Next, in operation 1308, the JCVM transmits an instruction to update the virtual file system based on the processing of the command. Finally, in operation 1310, an instruction is transmitted to update the physical file system accordingly.

As with the operations illustrated in FIG. 12, the operations depicted in FIG. 13 may vary based on the design of the implementing system. For instance, when the mobile device utilizes a TEE, operations performed by the JCRE, JCVM and virtual FS may be condensed such that commands may be transmitted to the TEE, which then transmits the commands directly to the physical FS stored within the TEE, and responses may be similarly streamlined.

By utilizing combinations of these additional security measures, a virtualized eUICC can be stored by an application processor in addition to or even in the absence of a TEE. In this fashion, a method may be implemented using biometric information to securely configure a Java Card virtual machine operating on a mobile device's application processor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A mobile station comprising: a modem and at least one antenna configured to communicate with a plurality of cellular networks; and
one or more memories storing computer-executable instructions that, when executed,
configure a mobile application running on a processor that facilitates communication between the modem and a virtual reprogrammable universal integrated circuit chip (eUICC) that is not physically or electrically connected to the modem, wherein security of the virtual eUICC is maintained using user-provided biometric information; and
configure the mobile station to host the virtual eUICC by causing initialization of a data storage module with the user-provided biometric information as a parameter for security operations; loading the data storage module upon a device boot-up to perform security operations based on the parameter to generate data that are formatted into data blocks; and cause storage of the data blocks processed by the security operations in a storage memory, wherein the storage memory maintains the data blocks in a journaling file system.

2. The mobile station of claim 1, further comprising:
a biometric information capturing element,
wherein the user-provided biometric information is captured by the biometric information capturing element.

3. The mobile station of claim 2, wherein the biometric information capturing element comprises a built-in fingerprint scanner or camera device.

4. The mobile station of claim 1, wherein the computer-executable instructions, when executed, further cause configuration of a virtual machine to host the virtual eUICC.

5. The mobile stations of claim 4, wherein the computer-executable instructions, when executed, cause a configuration of the virtual machine by causing the initialization;
the security operations including at least encryption and decryption with one or more signature keys;
the encryption and the decryption of data being associated with the virtual machine using the signature keys as encryption and decryption keys; digitally signing data associated with the virtual machine using the signature key; and storage of the digitally signed data in a storage memory.

6. The mobile station of claim 5,
wherein the digitally signed data comprises at least one of a GSM file system, one or more Java Card applications, or one or more network authentication keys, and
wherein the digitally signed data is formatted into data blocks.

7. The mobile station of claim 5, wherein digitally signing the data comprises signing checksums or hashes of the data with the signature key.

8. The mobile station of claim 5, wherein digitally signing the data comprises:
calculating redundancy check values for the data; and
signing the redundancy check values with random keys.

9. A method for communicating in multi-active mode with a plurality of cellular networks, the method comprising:
providing a mobile device having a modem and at least one antenna configured to communicate with a plurality of cellular networks; and
configuring a mobile application running on a processor to facilitate communication between the modem and a virtual reprogrammable universal integrated circuit chip (eUICC) that is not physically or electrically connected to the modem, wherein security of the virtual eUICC is maintained using use r-provided biometric information;
configuring the mobile station to host the virtual eUICC by causing initialization of a data storage module with the user-provided biometric information as a parameter for security operations;
loading the data storage module upon a device boot-up to perform security operations based on the parameter to generate data that are formatted into data blocks; and
causing storage of the data blocks processed by the security operations in a storage memory, wherein the storage memory maintains the data blocks in a journaling file system.

10. The method of claim 9, wherein the mobile device further includes a biometric information capturing element, and wherein the method includes capturing the user-provided biometric information using the biometric information capturing element.

11. The method of claim 9, further comprising: causing configuration of a virtual machine to host the virtual eUICC, wherein the causing of the configuration of the virtual machine includes causing the initialization;
the security operations including at least encryption and decryption with one or more signature keys;
the encryption and the decryption of data being associated with the virtual machine using the signature keys as encryption and decryption keys; digitally signing data associated with the virtual machine using the signature key; and storage of the digitally signed data in a storage memory.

12. The method of claim 11,
wherein the digitally signed data comprises at least one of a GSM file system, one or more Java Card applications, or one or more network authentication keys, and
wherein the digitally signed data is formatted into data blocks.

13. The method of claim 11, wherein digitally signing the data comprises signing checksums or hashes of the data with the signature key.

14. The method of claim 11, wherein digitally signing the data comprises:
calculating redundancy check values for the data; and
signing the redundancy check values with random keys.

15. One or more non-transitory computer-readable media storing computer-executable instructions that, when executed by a mobile station having a modem and at least one antenna configured to communicate with a plurality of cellular networks, cause the mobile station to:
configure a mobile application running on a processor to facilitate communication between the modem and a virtual reprogrammable universal integrated circuit chip (eUICC) that is not physically or electrically connected to the modem, wherein security of the virtual eUICC is maintained using user-provided biometric information;
configuring the mobile station to host the virtual eUICC by causing initialization of a data storage module with the user-provided biometric information as a parameter for security operations;
loading the data storage module upon a device boot-up to perform security operations based on the parameter to generate data that are formatted into data blocks; and causing storage of the data blocks processed by the security operations in a storage memory, wherein the storage memory maintains the data blocks in a journaling file system.

16. The one or more non-transitory computer-readable media of claim 15,
   wherein the mobile station further includes a biometric information capturing element, and
   wherein the user-provided biometric information is captured by the biometric information capturing element.

17. The one or more non-transitory computer-readable media of claim 15, wherein the computer-executable instructions, when executed by the mobile station, further cause the mobile station to cause configuration of a virtual machine to host the virtual eUICC by causing the initialization;
   the security operations including at least encryption and decryption with one or more signature keys;
   the encryption and the decryption of data being associated with the virtual machine using the signature keys as encryption and decryption keys; digitally signing data associated with the virtual machine using the signature key; and storage of the digitally signed data in a storage memory.

18. The one or more non-transitory computer-readable media of claim 17,
   wherein the digitally signed data comprises at least one of a GSM file system, one or more Java Card applications, or one or more network authentication keys, and
   wherein the digitally signed data is formatted into data blocks.

* * * * *